US011126762B2

(12) United States Patent
Dogru

(10) Patent No.: US 11,126,762 B2
(45) Date of Patent: Sep. 21, 2021

(54) LOCATING NEW HYDROCARBON FIELDS AND PREDICTING RESERVOIR PERFORMANCE FROM HYDROCARBON MIGRATION

(71) Applicant: Saudi Arabian Oil Company, Dhahran (SA)

(72) Inventor: Ali Haydar Dogru, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 392 days.

(21) Appl. No.: 15/907,828

(22) Filed: Feb. 28, 2018

(65) Prior Publication Data

US 2019/0266294 A1    Aug. 29, 2019

(51) Int. Cl.
    *G06G 7/48*    (2006.01)
    *G06F 30/20*   (2020.01)
    (Continued)

(52) U.S. Cl.
    CPC ............ *G06F 30/20* (2020.01); *E21B 47/107* (2020.05); *E21B 49/003* (2013.01);
    (Continued)

(58) Field of Classification Search
    None
    See application file for complete search history.

(56) References Cited

U.S. PATENT DOCUMENTS 6,980,940 B1    12/2005  Gurpinar et al.
7,478,024 B2     1/2009  Gurpinar et al.
(Continued)

FOREIGN PATENT DOCUMENTS

WO    2014185950 A1    11/2014
WO    2018017108 A1     1/2018

OTHER PUBLICATIONS

Chen et al., "Integrated Reservoir Simulation and Basin Models: Reservoir Charging and Fluid Mixing", 2009 SPE Reservoir Simulation Symposium held in the Woodlands, Texas, 2009, pp. 1-10, Society of Petroleum Engineers.
(Continued)

*Primary Examiner* — Rehana Perveen
*Assistant Examiner* — Cuong V Luu
(74) *Attorney, Agent, or Firm* — Bracewell LLP; Constance G. Rhebergen; Christopher L. Drymalla

(57) ABSTRACT

A data processing system is provided which determines the migration of oil and gas by a basin simulation section and predicts future reservoir performance from current reservoir production measures. The data processing system provides more accurate reservoir rock and fluid property distribution in reservoir locations between well locations where such attributes cannot be measured. The data processing system operates based on physical realities captured from migration by the basin simulation section. The data processing system differs from conventional methods, which use measurements obtained at the wells and interpolate between for regions between the wells using statistical techniques. Results from the data processing system shed more light into reservoir discontinuities among the wells, and yield better distribution of hydrogen sulfide, tar zones (Heavy Oil) within the reservoir. More accurate initial fluid and rock property distribution within the reservoir in a reservoir model obtained with the data processing system also improves production forecasting accuracy for hydrocarbon reservoirs by the reservoir simulation section.

25 Claims, 20 Drawing Sheets

(51) Int. Cl.
    *E21B 49/00*      (2006.01)
    *E21B 47/107*   (2012.01)
    *G01V 99/00*    (2009.01)
    *G06F 30/23*    (2020.01)
    *G06F 111/10*   (2020.01)

(52) U.S. Cl.
    CPC ...... *G01V 99/005* (2013.01); *G01V 2210/661* (2013.01); *G06F 30/23* (2020.01); *G06F 2111/10* (2020.01)

(56) References Cited

U.S. PATENT DOCUMENTS

| | | | |
|---|---|---|---|
| 7,603,265 B2 | 10/2009 | Mainguy et al. | |
| 7,725,302 B2 | 5/2010 | Ayan et al. | |
| 7,739,089 B2 | 6/2010 | Gurpinar et al. | |
| 7,953,585 B2 | 5/2011 | Gurpinar et al. | |
| 8,165,817 B2 | 4/2012 | Betancourt et al. | |
| 8,204,727 B2 | 6/2012 | Dean et al. | |
| 8,280,709 B2 | 10/2012 | Koutsabeloulis et al. | |
| 8,437,999 B2* | 5/2013 | Pita | G01V 99/005 703/10 |
| 9,188,699 B2* | 11/2015 | Carruthers | G06T 17/05 |
| 9,310,500 B2* | 4/2016 | Kacewicz | G01V 1/303 |
| 10,083,258 B2* | 9/2018 | Kauerauf | G01V 99/005 |
| 2002/0120429 A1* | 8/2002 | Ortoleva | G01V 11/00 703/2 |
| 2003/0080604 A1* | 5/2003 | Vinegar | E21B 43/30 299/14 |
| 2008/0040086 A1 | 2/2008 | Betancourt et al. | |
| 2011/0054869 A1* | 3/2011 | Li | G06F 30/20 703/10 |
| 2013/0226540 A1* | 8/2013 | Pita | G01V 99/00 703/2 |
| 2013/0346040 A1* | 12/2013 | Morales German | G01V 99/005 703/2 |
| 2015/0081265 A1 | 3/2015 | Kauerauf et al. | |
| 2015/0247940 A1* | 9/2015 | de Matos Ravanelli | G01V 1/305 703/10 |
| 2016/0070024 A1* | 3/2016 | Berard | G01V 99/005 703/10 |
| 2016/0103246 A1* | 4/2016 | Freeman | G01V 99/005 703/10 |
| 2017/0192118 A1* | 7/2017 | Du | G01V 1/282 |
| 2019/0293835 A1* | 9/2019 | Kauerauf | G01V 99/00 |

OTHER PUBLICATIONS

International Search Report and Written Opinion for related PCT application PCT/US2019/019764 dated Jun. 17, 2019.
Bethke, C., "A Numerical Model of Compaction-Driven Groundwater Flow and Heat Transfer and its Application to Paleohydrology of Intracratonic Sedimentary Basins"; Journal of Geophysical Research, Jul. 10, 1985; pp. 6817-6828; vol. 90, No. B8.
Hantschel, T. et al.; "Fundamentals of Basin and Petroleum Systems Modeling"; Springer Dordrecht Heidelberg; London, New York 2009; Chapter 1; pp. 1-30.
Hantschel, T. et al.; "Fundamentals of Basin and Petroleum Systems Modeling"; Springer Dordrecht Heidelberg; London, New York 2009; Chapter 3; pp. 103-149.
Hantschel, T. et al.; "Fundamentals of Basin and Petroleum Systems Modeling"; Springer Dordrecht Heidelberg; London, New York 2009; Chapter 5; pp. 199-245.
Himmelblau, D.; "Applied Non-Linear Programming", McGraw-Hill, Chapter 2—"The Nonlinear programming problem and its optimal soultion", The Univerty of Texas, Austin, TX, 1972.
Kouhanestani, et al.; "Fully Implicit Compositional Thermal Simulator USing Rigours Multiphase Calculations", Scientia Iranica, Sharif University of Technology; 2011, pp. 509-517.
Lucia, et al.; Fully Compositonal and Thermal Reservoir Simulations Efficiently Compare EOR Techniques, Society of Petroleum Engineers International, SPE 167184; 2013; pp. 1-17.

* cited by examiner

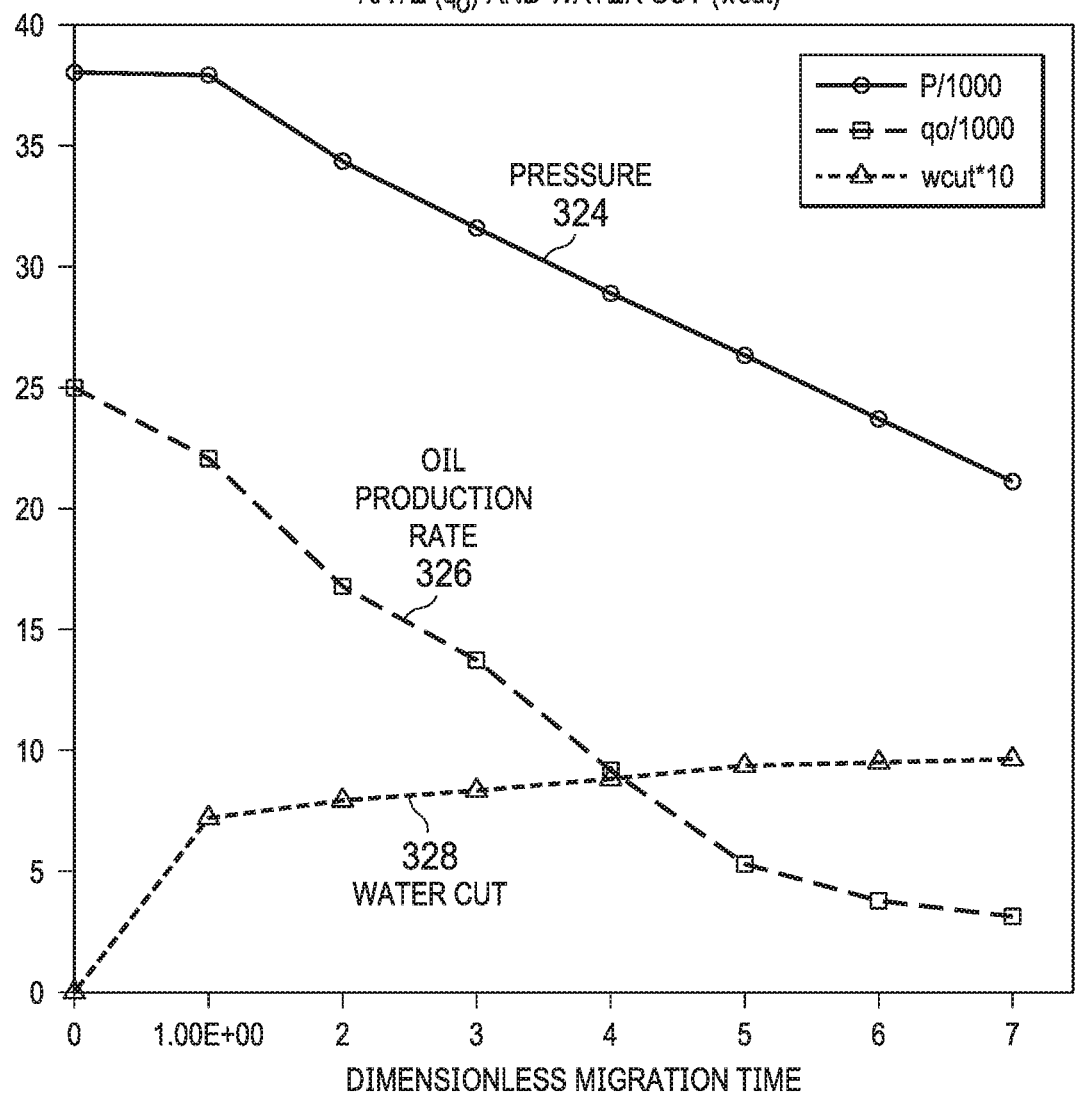

LOCATING NEW HYDROCARBON FIELDS AND PREDICTING RESERVOIR PERFORMANCE FROM HYDROCARBON MIGRATION

BACKGROUND OF THE INVENTION

1. Field of the Invention

The present invention relates to locating new oil & gas fields and predicting reservoir performance from hydrocarbon migration based on thermal simulation of thermal history and chemical reactions triggered by high temperature and pressure in subsurface geological structures.

2. Description of the Related Art

Reservoir simulators perform computer run of a reservoir model to examine both the flow of fluid within a subsurface reservoir and fluid flow from wells after production has begun from the reservoir. Reservoir simulators are built on reservoir models that include the petrophysical characteristics required to understand the behavior of the fluids over time. Usually, the simulator is calibrated using historic pressure and production data in a process referred to as "history matching." Once the simulator has been successfully calibrated, it is used to predict future reservoir production under a series of potential scenarios, such as drilling new wells, injecting various fluids or stimulation.

Basin simulators perform computer runs of quantitative models of geological processes in sedimentary basins over geological timescales spanning millions of years in the past. Basin simulators formed heat and fluid models in relation to sediment compaction and temperature from hydrocarbon generation. Basin simulators also formed models of fluid flow during subsurface migration and accumulation of hydrocarbons over past geological timescales during evolution of a geological basin.

In practice, basin simulators have been used to discover new oil and gas fields. Basin simulators reconstruct past geological history and locate new oil and gas reservoirs by simulating generation, migration and trapping hydrocarbons over the evolution of a geological basin during past geological timescales.

Reservoir simulators predict how an existing reservoir with wells actually producing hydrocarbon fluids can produce in the future. Reservoir simulation models provide indications of how many wells are to be drilled to maintain production levels, where and when to drill the wells, and what type of wells to be drilled. Reservoir simulators are used to manage current producing oil and gas reservoirs and to develop new fields.

Reservoir simulators begin their calculations based on the date that the reservoir is put on production such as today whereas basin simulators consider how basins were formed by deposition of layers until the present.

So far as is known, reservoir simulators and basin simulators have dealt with different times of investigation and different physical principles. Further, reservoir simulators and basin simulators were operated separately for different purposes and to obtain separate and different results.

SUMMARY OF THE INVENTION

Briefly, the present invention provides a new and improved data processing system for locating the presence of hydrocarbons in subsurface formations in a region of interest having a reservoir producing hydrocarbons. The data processing system includes a simulator of predicted subsurface fluid, temperature, and pressure conditions in the region of interest. A basin simulation section of the simulator forms predicted measures of reservoir rock property and fluid property conditions in the reservoir. The basin simulation section also adjusts the formed predicted measures at a specified time during production of hydrocarbons from the producing reservoir to match actual reservoir rock property and fluid property conditions of the producing reservoir at the specified time. The simulator of the data processing system also includes a reservoir simulation section which forms predicted measures of reservoir rock property and fluid property conditions in the producing reservoir at times during production from the reservoir other than the specified time.

The data processing system also includes a processor which adjusts the formed predicted measures of reservoir rock property and fluid property conditions at the specified time from the basin simulation section with the predicted measures of reservoir rock property and fluid property conditions from the reservoir simulation section to correspond within a specified degree of accuracy. The basin simulation section also forms measures of reservoir rock property and fluid property conditions at times prior to the specified time to indicate presence of hydrocarbons in the region of interest away from the producing reservoir.

BRIEF DESCRIPTION OF THE DRAWINGS

FIG. 25 is a plot of predicted performance of wells as a function of time starting at a date on which an field was put on production.

DETAILED DESCRIPTION OF THE PREFERRED EMBODIMENTS

Introduction

Figure 1:
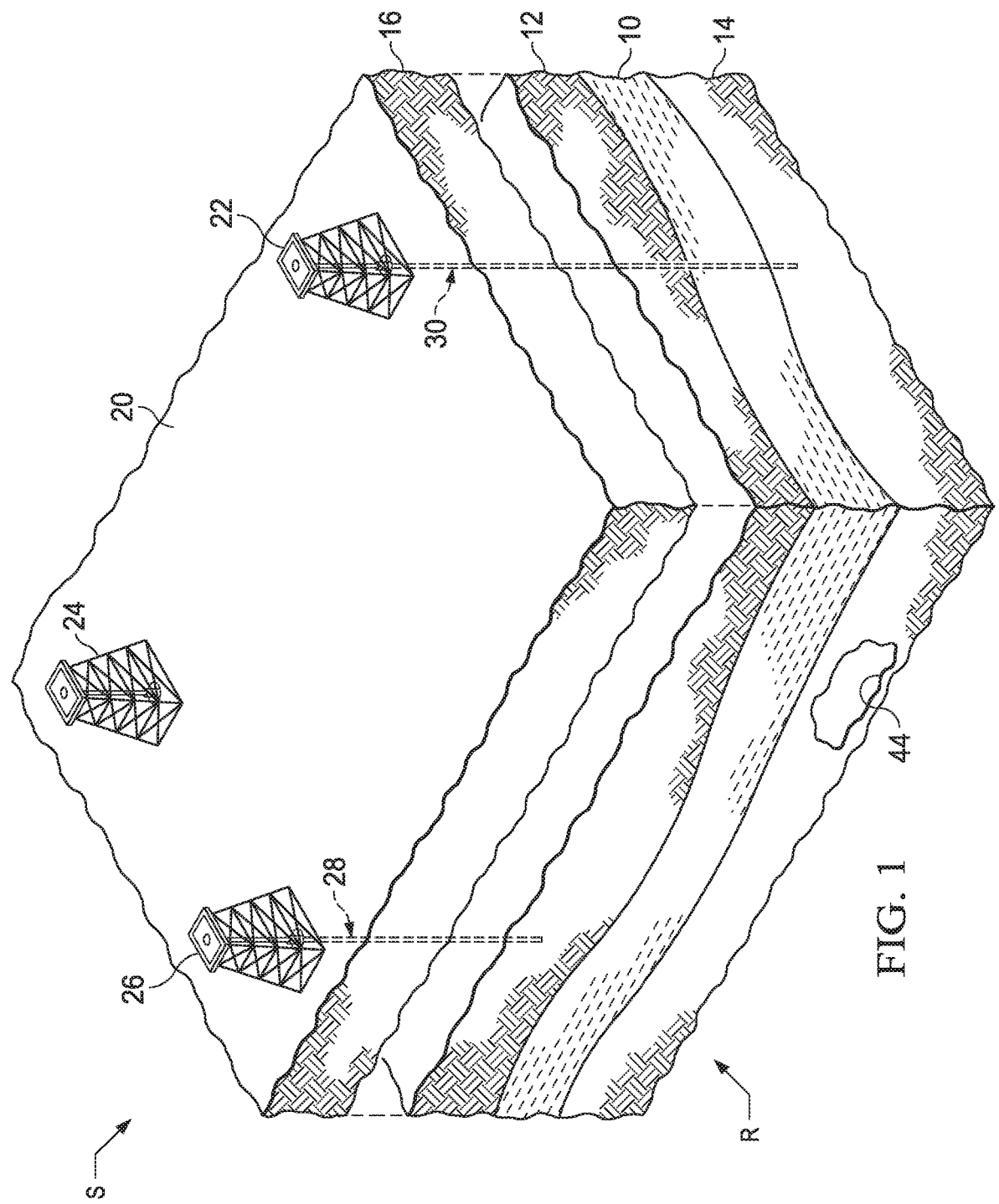
FIG. 1 is a schematic diagram of three dimensional subsurface formations in the earth at a location of interest for locating new hydrocarbon fields and predicting reservoir performance according to the present invention.

In the drawings, FIG. 1 is an isometric view in schematic form of subsurface geological structure S or formations in the earth at a location where a subsurface hydrocarbon reservoir R in the form of a hydrocarbon producing formation rock layer 10 is present. As shown in FIG. 1, the hydrocarbon producing formation rock layer 10 is present beneath several other formation rock layers, such as indicated at 12, 14 and 16 below the earth surface 20. As indicated at 22, 24 and 26, exploratory or production wells have been drilled to penetrate the earth formations through wellbores as indicated at 28 and 30.

The wells 22, 24 and 26 which are production wells exhibit a flow from the subsurface reservoir R which takes the form of a fluid mixture of hydrocarbons (oil and gas) and water or brine. The fluids being produced enter the production wells from a trap 32 (FIG. 2) where hydrocarbon gas 34, Light Oil 36 and Heavy Oil 38 are encapsulated or trapped above brine or water in a permeable formation 40 beneath an impermeable formation 42.

The origin of the hydrocarbon oils 34 and 36 and hydrocarbon gas 32 is a source region 44 at a separate location in a formation 46 often separated some distance from the trap 32. The flow of hydrocarbons shown schematically at 58 from source region 44 take place in porous media of the subsurface formations filled with water over geological time. In source region 44, over the millions of years of geological time, organic material (or kerogen) in sediments has been buried under many depositing layers. The kerogen in source region 44 is subject to high temperature and pressure.

Kerogen is originally composed mainly of heavy hydrocarbon chains. In source region 44, the kerogen is under high temperature and pressure. This process is sometimes referred to as cooking and the source location 44 in this context is called a kitchen. In this process, under the high pressure, similar to a petroleum refinery, heavy hydrocarbon molecules are cracked into lighter molecular components, yielding different hydrocarbon products at different temperatures over time.

Figure 2:
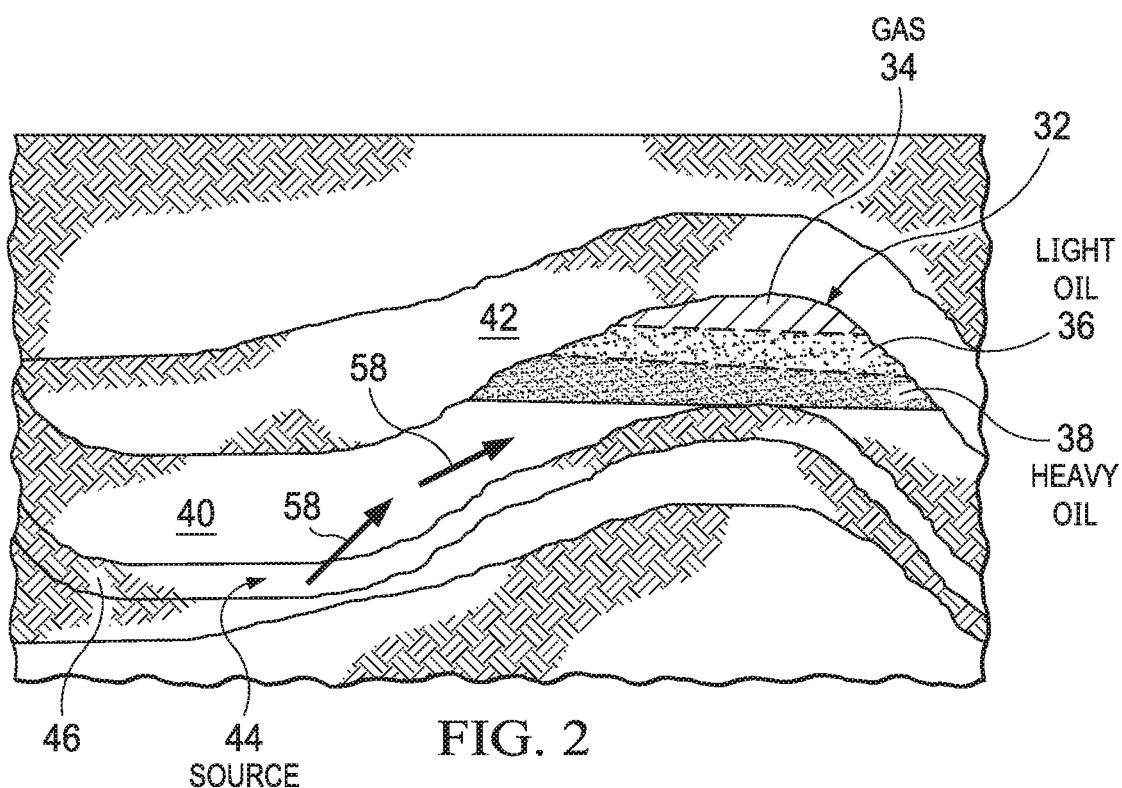
FIG. 2 is an enlarged diagram of a portion of FIG. 1 illustrating generation, migration and trapping of different hydrocarbon compositions resulting from chemical reactions triggered by high temperature and pressure in a subsurface geological structure.
Figure 3:
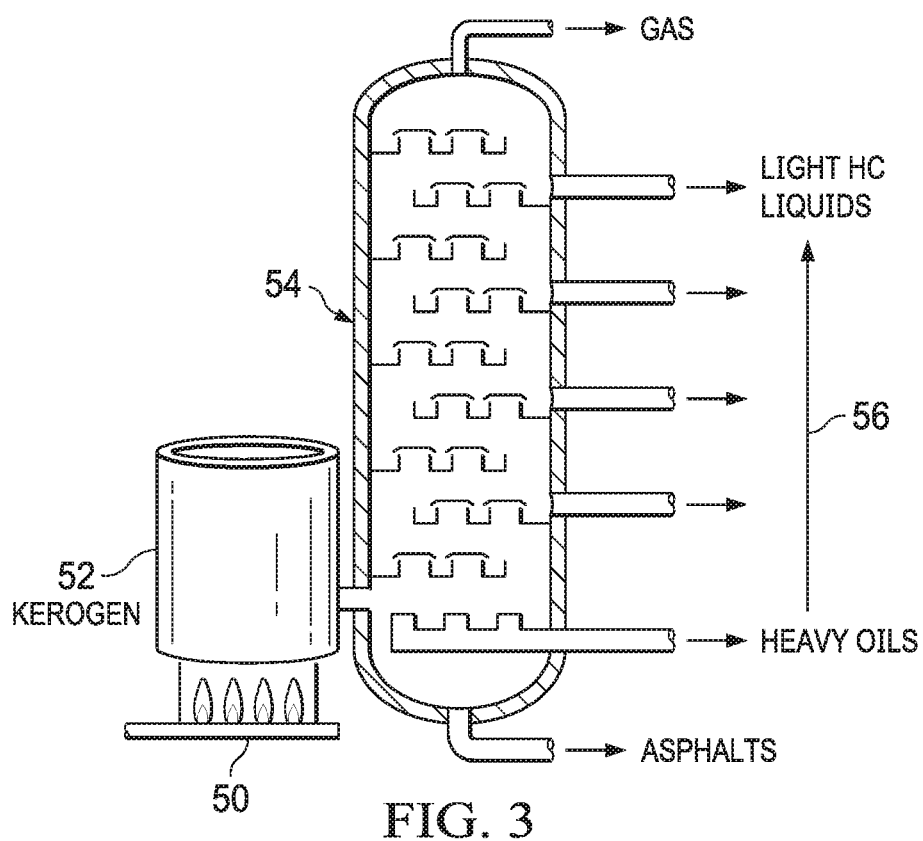
FIG. 3 is a schematic diagram illustrating the transformation in a subsurface formation of organic sediments into lighter hydrocarbons from chemical reactions triggered by high temperature and pressure in a subsurface geological structure.

In FIG. 3, the cooking of kerogen over time the high temperature is illustrated schematically by a burner or heat source 50 acting on kerogen 52, while the source region is illustrated schematically as a pressure vessel 54. As indicated schematically at 56, hydrocarbons over geological time migrate as a result of heat and pressure as gas and as Light Oils and Heavy Oils and as asphalt. The oils and gases over time migrate through subsurface layers as indicated by arrow 58 to reach locations of traps such as shown at 32 (FIG. 2).

According to the present invention, a data processing system D (FIG. 4) is provided for locating the presence of hydrocarbons in subsurface formations in a region of interest having a reservoir producing hydrocarbons. The data processing system D performs basin simulation and reservoir simulation operating interactively, with the results of the two simulation operations adjusting subsequent simulation runs to locate the presence of likely new oil and gas accumulations in a region of interest in the structure S near the producing reservoir R. The basin simulation and reservoir simulation in the data processing system D are performed in connection with a reservoir model composed of grid cells, examples of which are described in commonly owned U.S. Pat. Nos. 7,596,480; 8,359,185; 8,437,999; 9,164,191; and 9,471,723.

In the subsurface geological structure S, flow of hydrocarbons takes place in porous media filled with water. As will be described, the data processing system D forms a geological model which is based on thermal and chemical reactions taking place during the generation a migration of oil and gas. Further, thermal conditions in the reservoir at a common time such as when production begins, are the same. Thus mathematical expressions of thermal conditions for bath reservoir and basin simulation should be the same.

However, basin simulation involves a number of temperature and pressure conditions, as well as reservoir attributes or parameters, which are variable. Also, the interplay and impact of these conditions and parameters on basin simulation results is not physically susceptible to determination. There is thus a high degree of uncertainty in the geological history over millions of years from basin simulation. According to the present invention, past geological history of the subsurface structure from basin simulation is calibrated using non-linear programming, by solving a mathematical inverse problem.

Further, basin simulation is based on moving grids to define subsurface as it moves over geological time. By contrast, reservoir simulation is based on stationary grids. Both simulators assume flow through porous media. Basin simulation involves modeling generation of oil of different compositions based on chemical reactions triggered by high temperature and pressure. Subsurface generation of oil due to thermal and chemical principles is much like petrochemical reactions in what is in effect an underground refinery.

The data processing system D calibrates basin simulation by changing various parameters of the basin simulation until the predicted measures of reservoir rock property and fluid property conditions match the measured initial fluid, pressure, and temperature distribution conditions of the producing reservoir. The data processing system D calibrates (or history matches) simulation predicted well performance such as pressures, and fluid production to the field measured values. The data processing system D then performs ongoing reservoir simulation as required for managing the reservoir R.

The data processing system D performs a geological calibration or geological history match as a non-linear optimization inverse problem, rather than using trial and error. Since there is a high degree of uncertainty in the geological history over millions of years, the past history of the basin is in effect calibrated according to the present invention by the non-linear optimization methodology.

After the geological history is calibrated, the data processing system D performs further basin simulation runs to locate additional new oil and gas reservoirs. The likelihood of new oil and gas accumulations should be higher with a geologically history matched basin simulation calibrated based on actual production measures from the producing reservoir R. Accuracy of the new prospect locations depends on the accuracy of the geological history match. In fact accuracy will increase if more known reservoir initial conditions were matched.

Data Processing System

Figure 4:
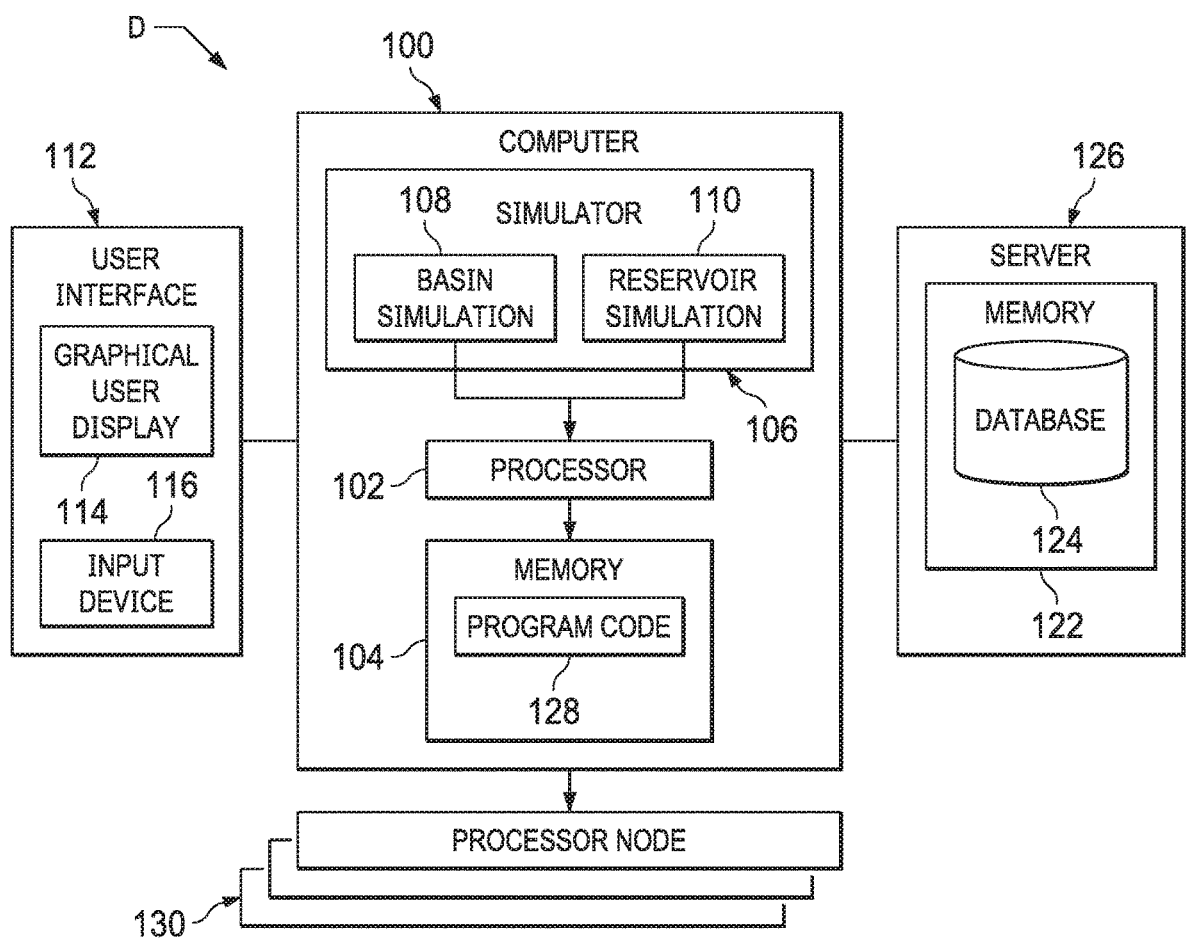
FIG. 4 is a schematic block diagram of a data processing system for locating hydrocarbon presence of new fields and predicting reservoir performance from hydrocarbon migration according to the present invention.

As illustrated in FIG. 4, the data processing system D includes a computer 100 having a processor 102 and memory 104 coupled to the processor 102 to store operating instructions, control information and database records therein. The data processing system D is preferably a multicore processor with nodes such as those from Intel Corporation or Advanced Micro Devices (AMD), or an HPC Linux cluster computer. The data processing system D may also be a mainframe computer of any conventional type of suitable processing capacity such as those available from International Business Machines (IBM) of Armonk, N.Y., or other source. The data processing system D may in cases also be a computer of any conventional type of suitable processing capacity, such as a personal computer, laptop computer, or any other suitable processing apparatus. It should thus be understood that a number of commercially available data processing systems and types of computers may be used for this purpose.

The computer 100 includes a simulator 106 of predicted subsurface fluid, temperature, and pressure conditions in the region of interest. The simulator 106 includes a basin simulation section 108 which forms predicted measures of reservoir rock property and fluid property conditions in the reservoir. The basin simulation section 108 also adjusts the formed predicted measures at a specified time during production of hydrocarbons from the producing reservoir to match actual reservoir rock property and fluid property conditions of the producing reservoir at the specified time. The simulator 106 also includes a reservoir simulation section 110 which forms predicted measures of reservoir rock property and fluid property conditions in the producing reservoir at times during production from the reservoir other than the specified time.

The processor 102 adjusts the formed predicted measures of reservoir rock property and fluid property conditions at the specified time from the basin simulation section 108 with the predicted measures of reservoir rock property and fluid property conditions from the reservoir simulation section 110 to correspond within a specified degree of accuracy. The basin simulation section 108 further forms measures of reservoir rock property and fluid property conditions at times prior to the specified time to indicate presence of hydrocarbons in the region of interest away from the producing reservoir.

The basin simulation section 108 may be a steam flood simulator of the type described, for example, in "Fully Compositional and Thermal Reservoir Simulations Efficiently Compare EOR Techniques." by Angelo Lucia, SPE 167184, proceedings of the SPE Unconventional Resources Conference—Canada, Calgary, Alberta, Canada, Nov. 5-7, 2013. The basin simulation section 108 may also be a thermal simulator of the type described, for example in "Fully implicit compositional thermal simulator using rigorous multiphase calculations," by S. Khorsandi Kouhanestani et al., Transactions C: Chemistry and Chemical Engineering Scientia Iranica, (2011), Vol 18 (3), p. 509-517.

The reservoir simulation section 110 may be of the type known as GigaPOWERS described in the literature. See, for example articles by applicant Dogru. A. H. et al., "A Next-Generation Parallel Reservoir Simulator for Giant Reservoirs," SPE 119272, proceedings of the 2009 SPE Reservoir Simulation Symposium. The Woodlands, Tex., USA, Feb. 2-4, 2009 and by Dogru. A. H., Fung, L. S., Middya, U., Al-Shaalan, T. M., Byer, T., Hoy, H., Hahn, W. A., Al-Zamel, N., Pita, J., Hemanthkumar, K., Mezghani, M., Al-Mana, A., Tan, J, Dreiman, T., Fugl, A, Al-Baiz, A., "New Frontiers in Large Scale Reservoir Simulation," SPE 142297, Proceedings of the 2011 SPE Reservoir Simulation Symposium. The Woodlands, Tex., USA, Feb. 21-23, 2011. GigaPOWERS reservoir simulation is capable of fine-scale grid simulation that exceeds a billion-cell barrier for postprocessing while utilizing hundreds of gigabyte or GB footprints per scenario. GigaPOWERS is a trademark of applicant Saudi Arabian Oil Company for computer processing of this type.

The computer 100 is accessible to operators or users through user interface 112 and are available for displaying output data or records of processing results obtained according to the present invention with an output graphic user display 114. The output display 114 includes components such as a printer and an output display screen capable of providing printed output information or visible displays in the form of graphs, data sheets, graphical images, data plots and the like as output records or images.

The user interface 112 of computer 100 also includes a suitable user input device or input/output control unit 116 to provide a user access to control or access information and database records and operate the computer 100. Data processing system D further includes a database of data stored in computer memory, which may be internal memory 104, or an external, networked, or non-networked memory as indicated at 122 in an associated database 124 in a server 126.

The data processing system D includes program code 128 stored in non-transitory the memory 104 of the computer 100. The program code 128 according to the present invention is in the form of computer operable instructions causing the data processor 102 according to the present invention to locate the presence of hydrocarbons in subsurface formations in a region of interest having a reservoir producing hydrocarbons.

The data processing system D may take the form of a single CPU, or as shown in FIG. 4 a computer cluster or grouping of computers 130 referred to as processor nodes, connected via a network.

Nomenclature

1. Basin Simulation Optimization $\vec{x}_B$: Vector unknowns to be matched
J: Objective Function
w: well
$n_w$ = number of wells
$W_p$ = weighting factor for wells for pressure p
$W_T$ = weighting factor for wells for temperature T
$W_{CH_4}$ = weighting factor for wells for methane $CH_4$
$W_{H_2S}$ = weighting factor for wells for hydrogen sulfide $H_2S$
$W_{CO_2}$ = weighting factor for wells for carbon dioxide $CO_2$
$W_h$ = weighting factor for wells for formation thickness h
$W_k$ = weighting factor for wells for formation permeability k
$W_\varphi$ = weighting factor for wells for formation porosity $\varphi$
$W_{S_j}$ = weighting factor for wells for formation fluid saturation $S_j$; j=oil, gas, water
$W_{C_j}$ = weighting factor for concentration of component $C_i$: (i=$CH_4$, $CO_2$, $H_2S$, $C_2H_4$, . . . )

2. Reservoir Attributes and Differences $P^{res}_{[i(w),j(w),k(w)]} - P^{basin}_{[i(w),j(w),k(w)]}$: pressure difference between well perforations at i, j, k grid blocks for well w
$T^{res}_{[i(w),j(w),k(w)]} - T^{basin}_{[i(w),j(w),k(w)]}$: temperature pressure difference between well perforations at i, j, k grid blocks for well w
$C_{CH_4}^{res}[i(w),j(w),k(w)] - C_{CH_4}^{basin}[i(w),j(w),k(w)]$: difference in component methane $CH_4$ concentration at same perforation at i, j, k grid blocks for well w
$C_{H_2S}^{res}[i(w),j(w),k(w)] - C_{H_2S}^{basin}[i(w),j(w),k(w)]$: difference in component hydrogen sulfide $H_2S$ concentration at same perforation at i, j, k grid blocks for well w
$h^{res}[i(w),j(w),k(w)] - h^{basin}[i(w),j(w),k(w)]$: difference in formation thickness h at same perforation at i, j, k grid blocks for well w
$k^{res}[i(w),j(w),k(w)] - k^{basin}[i(w),j(w),k(w)]$: difference in formation permeability k at same perforation at i, j, k grid blocks for well w
$\Phi^{res}[i(w),j(w),k(w)] - \Phi^{basin}[i(w),j(w),k(w)]$: difference in formation porosity $\Phi$ at same perforation at i, j, k grid blocks for well w
$S_j^{res}[i(w),j(w),k(w)] - S_j^{basin}[i(w),j(w),k(w)]$: difference in fluid saturation S for fluid phase j=oil, water, gas at same perforation at i, j, k grid blocks for well w
$C_i^{res}[i(w),j(w),k(w)] - C_i^{basin}[i(w),j(w),k(w)]$: difference in concentration of component $C_i$ at same perforation at i, j, k grid blocks for well w 3. Reservoir Formation Rock Properties h: formation thickness
k: formation (rock) permeability (or thermal conductivity)
$\Phi$: formation porosity
$S_j$: fluid saturation for fluid phase j=oil, water, gas
$C_i$: Concentration of component i($CH_4$, $CO_2$, $H_2S$, $C_2H_4$, . . . )

Figure 5:
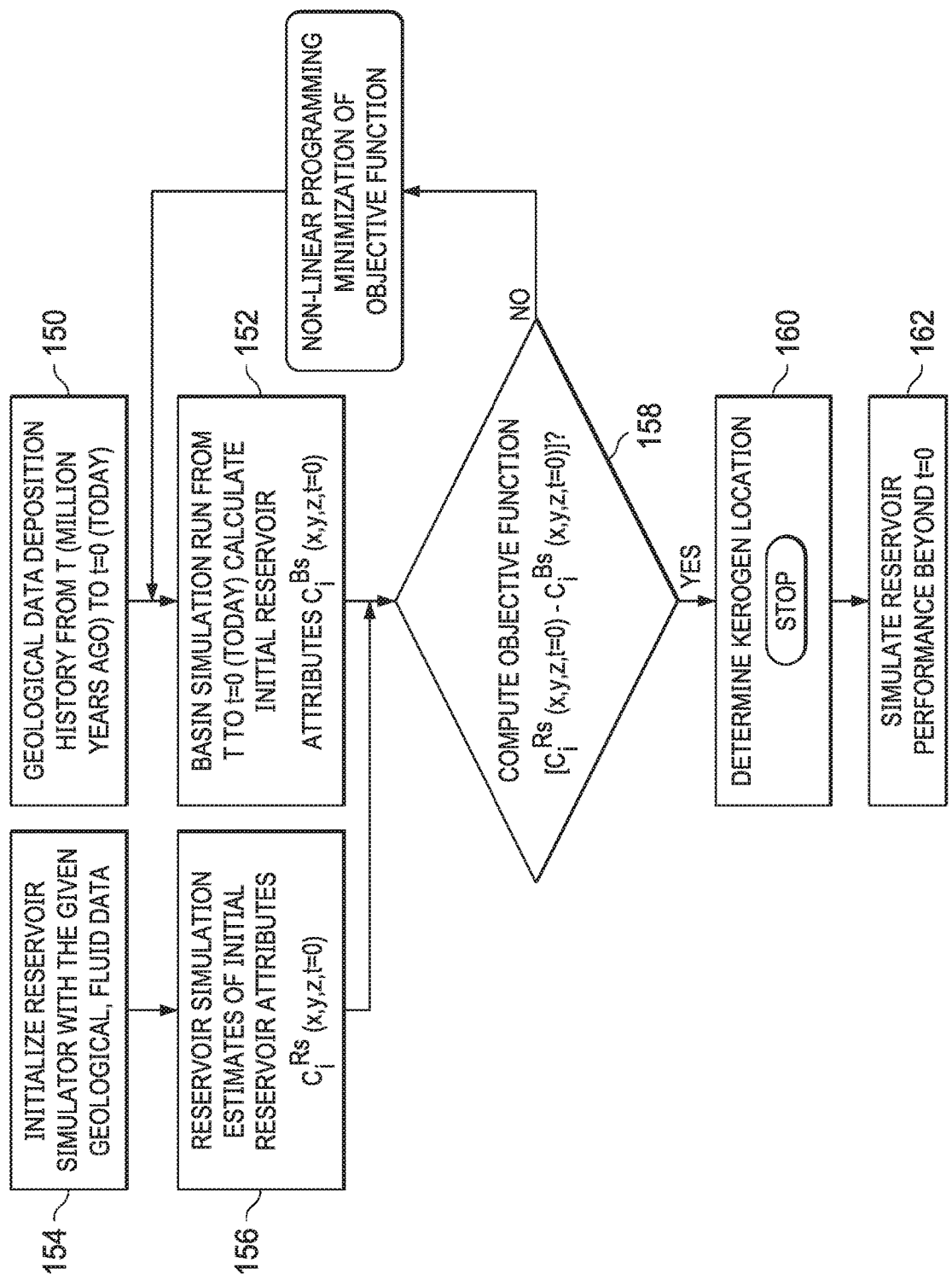
FIG. 5 is a schematic diagram of workflow for locating hydrocarbon presence and predicting reservoir performance from hydrocarbon migration with the data processing system of FIG. 4.

4. Component Mass Balance/Heat Balance $T_d$: Transmissibility in direction d
$\overline{T_d}$: Thermal conductivity based transmissibility in direction d
x: 3-dimensional grid coordinate in horizontal x plane
y: 3-dimensional grid coordinate in horizontal y plane
z: 3-dimensional grid coordinate in vertical z plane
$n_p$: cumulative fluid production
$p_{ob}$: overburden pressure
$\mu$: viscosity
$\rho$: density
$k_r$: relative permeability
$\Phi$: fluid pressure
$q^{abs}$: heat absorbed
$q^{gen}$: heat generated
$q^{loss}$: heat loss
$V_B$: bulk volume
h: specific enthalpy Operation of Data Processing System FIG. 5 illustrates schematically the functionality and operation of the data processing system D according to the present invention. The data processing system D according to the present invention first predicts initial conditions in the subsurface region S of interest. The basin simulation section 108 also adjusts the formed predicted measures to match measured initial conditions of the reservoir R located in the subsurface region S at a specified time. The specified time is t=0, the beginning of production of hydrocarbons from the reservoir R. The matching done by basin simulation section 108 is of reservoir attributes indicating rock property and fluid property distribution in the reservoir model of the producing reservoir R at the specified time.

As shown at 150, the basin simulation section 108 receives a geological data description for the subsurface region S of interest from memory 104. The geological data description contains information for the cells of the reservoir model in three dimensional (x, y, z) matrix form for three dimensional grid coordinate (i, j, k) at a location of reservoir model grid cells and time (t) about present day layers, horizons and their facies, paleo geometry, depositional ages over geologic time, boundary conditions and facies properties over geologic Time.

As shown at 152, the basin simulation section 108 is run at the time t=0 to determine a set of initial reservoir attributes for the matrix of cells of the reservoir model according to three dimensional grid coordinate (i, j, k) location. Example initial reservoir attributes at the time t=0 of beginning reservoir production for the cells of the reservoir model according to the present invention include fluid measures, such as pressure, temperature, fluid saturations, component fluids and concentrations; and formation parameters such as porosity, permeability, layer thickness and the like for three dimensional grid coordinate (i, j, k) location of reservoir model grid cells of subsurface region S, as identified in the Nomenclature section above.

As indicated at 154, the reservoir simulation section 110 is initialized at the time t=0 of beginning reservoir production with reservoir attributes for the cells of the reservoir model in matrix form for three dimensional grid coordinate (i, j, k) location of reservoir model grid cells and time (t) with geological and fluid data from memory 104 relating to the producing reservoir R. As shown at 156, the reservoir simulation section 110 performs a reservoir simulation based on the initial set of reservoir attributes generated by basin simulation section 108 as described above, and on the geological and fluid data from memory 104. The reservoir attributes provided reservoir simulation section 110 thus, for example, include fluid measures and formation parameters as identified in the Nomenclature section above.

The processor 102 of data processing system D calibrates the reservoir model as indicated at 158. The calibration minimizes the objective function J, as described below, for the differences between the reservoir attributes produced by the basin simulation section 108 and the reservoir simulation section 110 for the matrix of grid cells of the reservoir model.

The calibrating operation performed by processor 102 in step 158 is geological history matching of the reservoir attribute fluid measures and formation parameters as identified in the Nomenclature section above produced from the simulation sections 108 and 110. The basin simulation section 108 performs basin simulation based, as described above, on initial reservoir conditions of the reservoir. Initial conditions are composed of measured physical quantities of the hydrocarbon reservoirs such as distribution of various hydrocarbon components, for example: methane concentration in liquid oil or gas, $CO_2$ concentration in oil or gas, fluid pressure variation, temperature variation, thickness of rock formation at wells, types of rocks and rock properties measure at wells such as permeability and porosity.

The geological history matching during 158 is a non-unique (in that there may be several probable sets of attributes) inverse problem of determining reservoir attributes from observed data in nature. The availability of more observed variables to match will increase the chance for uniqueness. FIGS. 6 through 16 illustrate examples of reservoir attributes (variables) produced by basin simulation section 108 to match measured physical quantities of the hydrocarbon reservoirs during the geological history match performed by the processor 102.

In addition to the Geological History matching 158 by processor 102, the basin simulation section 108 as indicated at 160 (FIG. 5) determines possible locations in the subsurface S for the kerogen rock source region 44. This is done, as will be described below, for prediction of new oil and gas accumulations in the subsurface formations. The reservoir simulation section 110 as indicated at 162 (FIG. 5) further performs reservoir simulation runs of future reservoir performance.

Forming Measures of Predicted Reservoir Conditions for Basin Simulation

Example variables being matched by processor 102 include: vertical profiles of pressure $P(z)$ (FIG. 6) at wells between the Basin simulator and reservoir model (measure initial condition) at wells: temperature distribution $T(z)$ (FIG. 7) at wells; methane concentration $CH_4(z)$ (FIG. 8), or any other measured quantity at wells. Other example variables for matching include: vertical water saturation distribution $S_w(z)$ (FIG. 9) at wells (measured by well logs or core flood tests); gas saturation $S_g(z)$ (FIG. 10); and Gas Oil and Water Oil contacts, areal distribution of the permeability, porosity, and formation thickness maps. The number of attributes to be used in solving the Inverse problem can be decided by the availability of the data.

Figure 6:
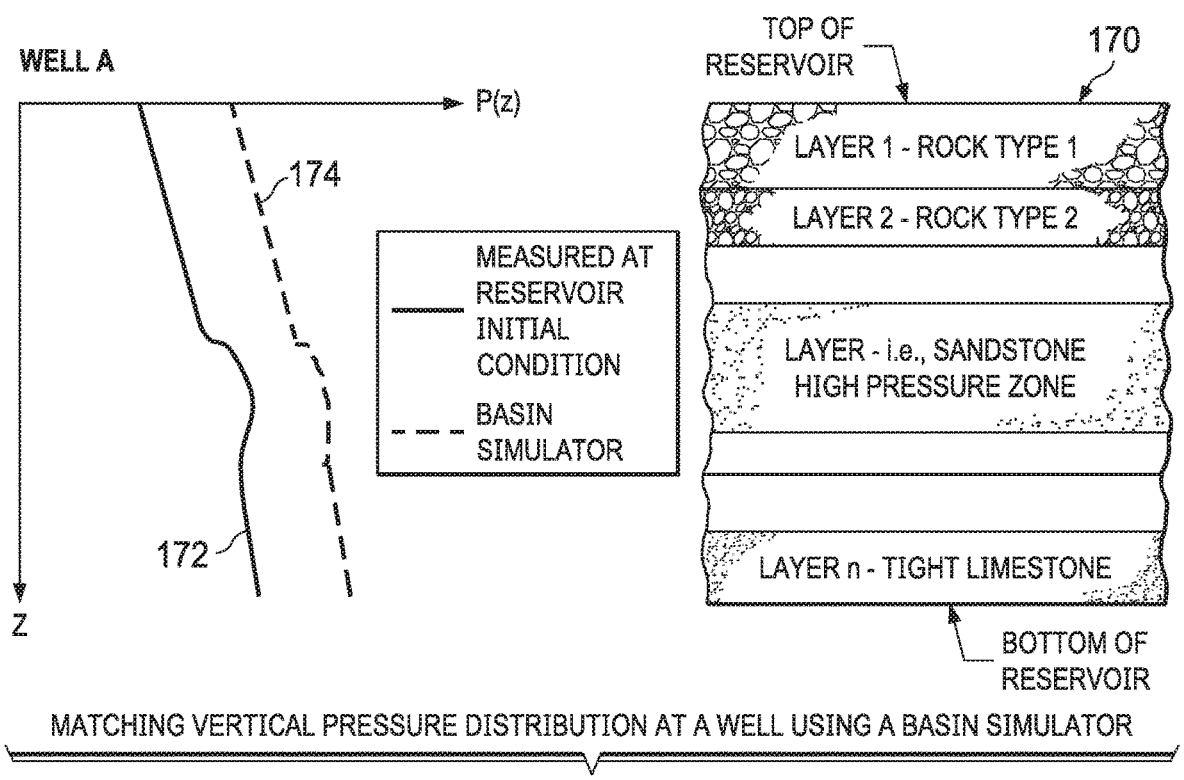
FIG. 6 is a schematic diagram illustrating results of history matching with a basin simulation section of the data processing system of FIG. 4 of vertical pressure distribution over depth intervals of interest in a well.

FIG. 6 illustrates schematically simulated results of history matching of measured vertical pressure distribution $P(z)$ over depth intervals z of interest for formation layers having different attributes as indicated at 170 in an existing vertical well for basin simulation section 108 of the data processing system of FIG. 4. FIG. 6 illustrates at 172 an initial reservoir condition of vertical pressure distribution $P(z)$ measured in an existing well to be history matched for basin simulation section 108 by the data processing system D with measured vertical pressure distribution $P(z)$. The vertical pressure distribution at 172 is obtained from pressure well logging runs or pressure transients tests performed in a well in the reservoir.

Measured production and formation parameters information/data such as vertical pressure distribution for reservoirs are only available at existing well locations. Simulation runs of the basin simulation section 108 are performed to provide different vertical pressure profiles one of which is shown at 174. The basin simulation section 108 is calibrated by the operating methodology shown in FIG. 5 with the processor 102 of the data processing system D until the vertical pressure profile $P(z)$ shown at 174 predicted by the basin simulation section 108 satisfactorily matches the measured pressure distribution 172 in the well.

Figure 7:
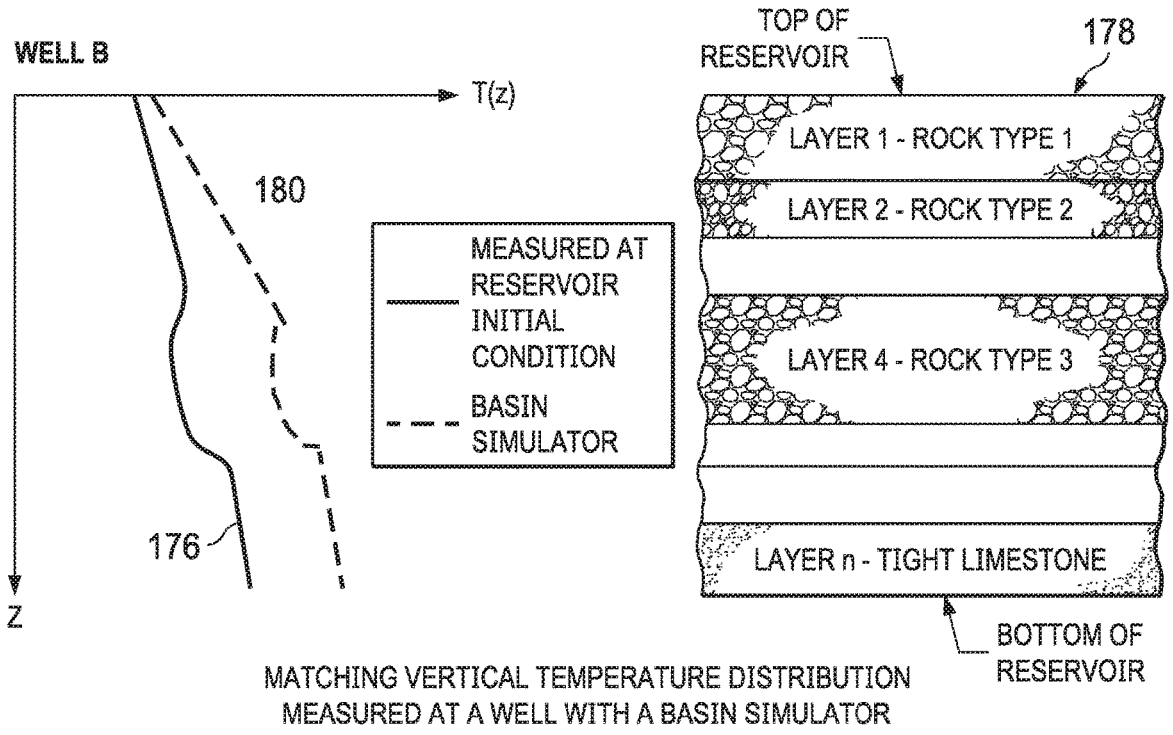
FIG. 7 is a schematic diagram illustrating results of history matching with a basin simulation section of the data processing system of FIG. 4 of vertical temperature distribution over depth intervals of interest in a well.

Similarly, FIG. 7 illustrates schematically simulated results of history matching of measured temperature distribution $T(z)$ shown at 176 over depth intervals z of interest for formation layers indicated at 178 in an existing well for basin simulation section 108 of the data processing system of FIG. 4. The vertical pressure distribution at 176 is obtained for example from temperature well logging runs performed in a well in the reservoir. Again, simulation runs of the basin simulation section 108 are performed to provide different temperature profiles one of which is shown at 180. The basin simulation section 108 is calibrated by the operating methodology shown in FIG. 5 with the processor 102 of the data processing system D until the temperature profile $T(z)$ shown at 180 predicted by the basin simulation section 108 satisfactorily matches the measured temperature distribution 176 in the well.

Figure 8:
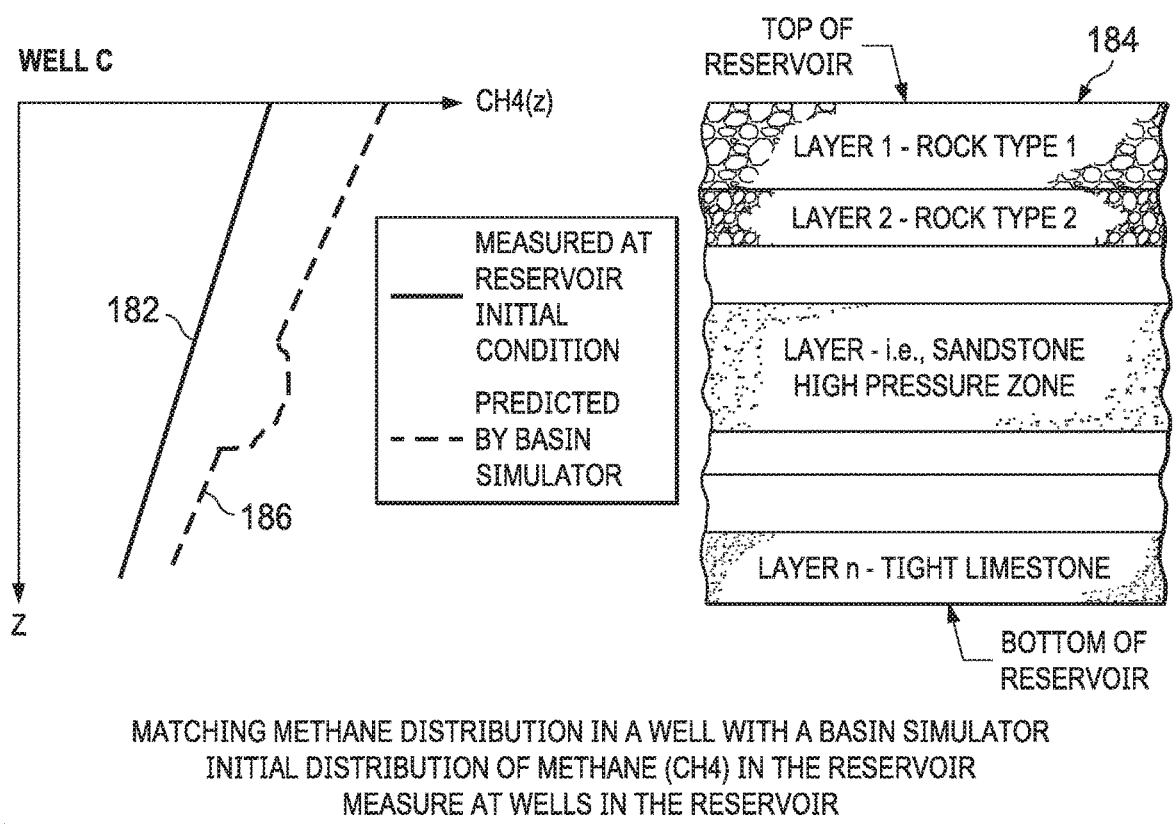
FIG. 8 is a schematic diagram illustrating results of history matching with a basin simulation section of the data processing system of FIG. 4 of methane distribution over depth intervals of interest in a well.

FIG. 8 is a diagram schematically illustrating simulated results of history matching for basin simulation section 108 of the data processing system of FIG. 4 of methane distribution $CH_4(z)$ shown at 182 over depth intervals z of interest for formation layers indicated at 184 in a well. The methane distribution shown at 182 is obtained for example from well logging runs performed in a well in the reservoir. Simulation runs of the basin simulation section 108 are performed to provide different methane distribution profiles, such as one is shown at 186. The basin simulation section 108 is calibrated by the operating methodology shown in FIG. 5 with the processor 102 of the data processing system D until the methane distribution $CH_4(z)$ shown at 186 predicted by the basin simulation section 108 satisfactorily matches the measured methane distribution 182 in the well.

Figure 9:
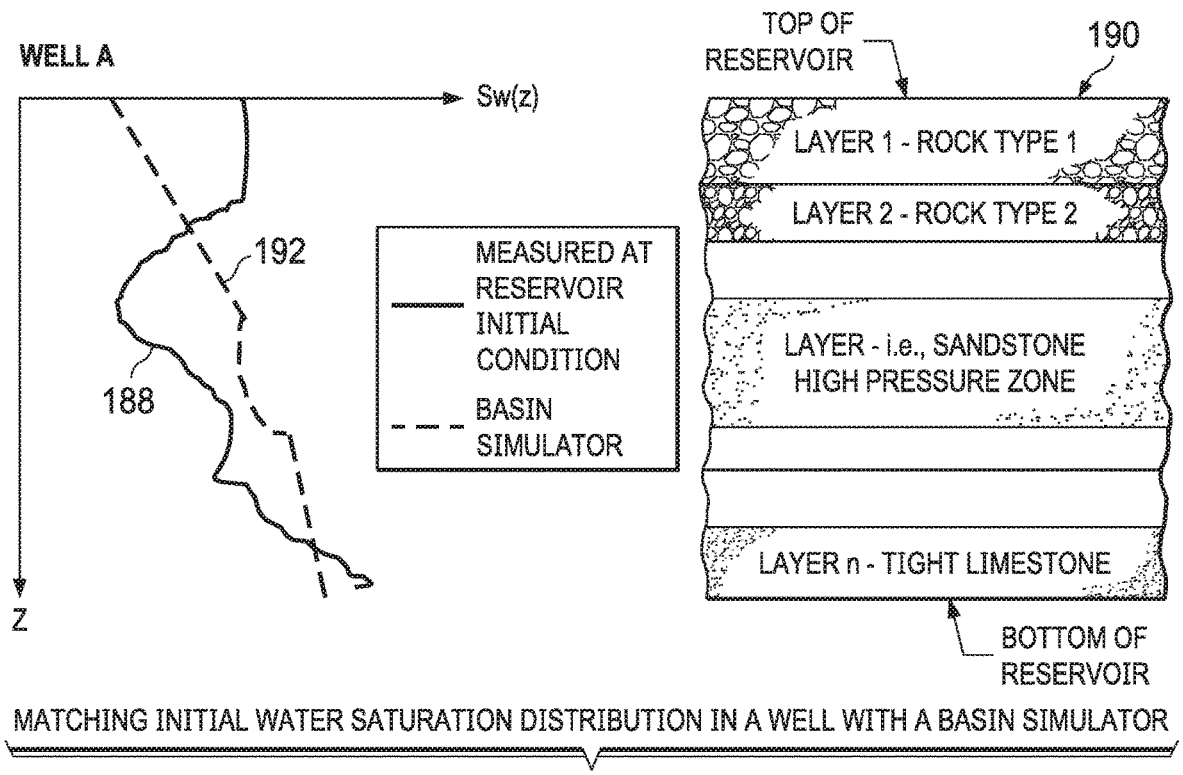
FIG. 9 is a schematic diagram illustrating results of history matching with a basin simulation section of the data processing system of FIG. 4 of initial water saturation distribution over depth intervals of interest a well to measured initial water saturation distribution.

FIG. 9, correspondingly, is a schematic diagram schematically illustrating simulated results of history matching for basin simulation section 108 of the data processing system of FIG. 4 of initial water saturation $S_w(z)$ shown at 188 over depth intervals z of interest for formation layers indicated at 190 in a well. The water saturation distribution shown at 188 is obtained for example from electrical resistivity or saturation well logging runs performed in a well in the reservoir. Simulation runs of the basin simulation section 108 are performed to provide different water saturation distribution profiles, such as one is shown at 192. The basin simulation section 108 is calibrated by the operating methodology shown in FIG. 5 with the processor 102 of the data processing system D until the initial water saturation $S_w(z)$ shown at 192 predicted by the basin simulation section 108 satisfactorily matches the measured water saturation distribution 188 in the well.

Figure 10:
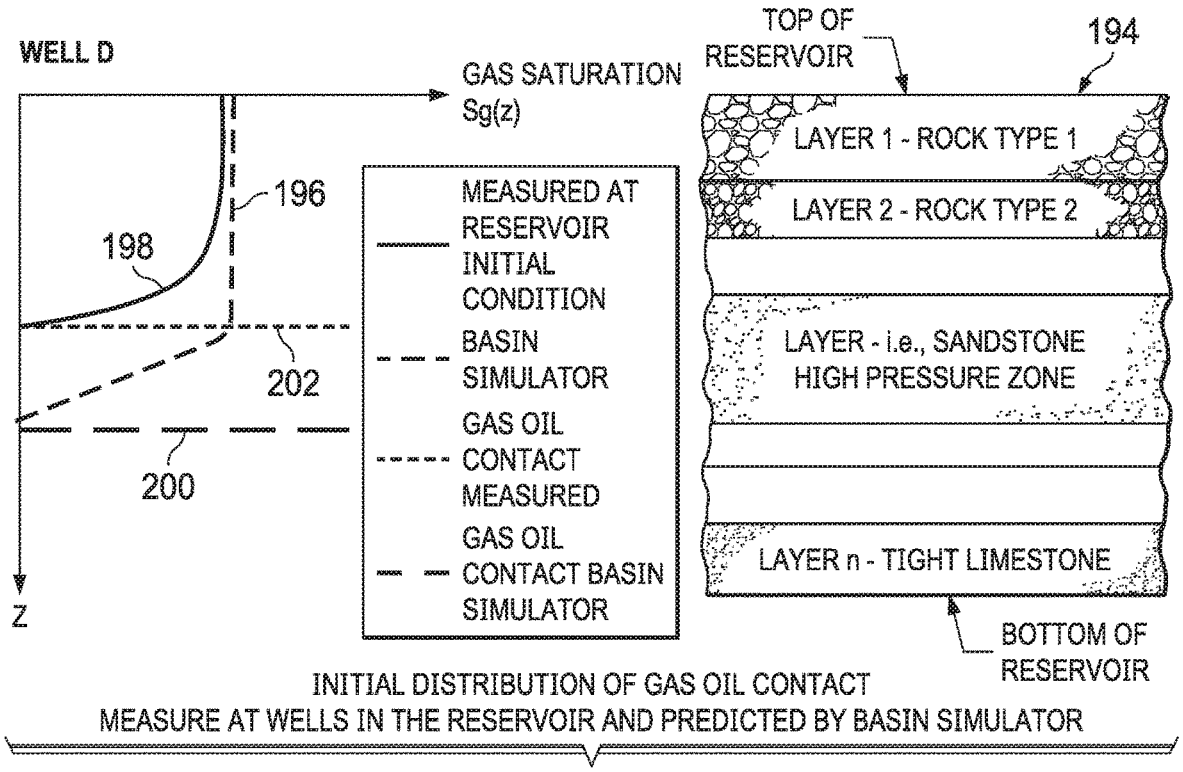
FIG. 10 is a schematic diagram illustrating results of history matching with a basin simulation section of the data processing system of FIG. 4 of a measured initial distribution of Gas Oil contact and gas saturation.

FIG. 10 schematically illustrates simulated results of calibrating measured depth of Gas Oil contact at a depth in formation layers indicated at 194 in an existing well. The Gas Oil contact shown at 196 is obtained from measurements made in the well. FIG. 10 also shows a gas saturation profile $Sg(z)$ as shown at 198 over depth intervals z of interest for formation layers as indicated at 194 from saturation well logging runs performed in the well. Simulation runs of the basin simulation section 108 are performed to provide different Gas Oil contact depths such as one shown at 200 and gas saturation distribution profiles, such as one is shown at 202. The basin simulation section 108 is calibrated by the operating methodology shown in FIG. 5 with the processor 102 of the data processing system D until the Gas Oil contact depths and gas saturation $Sg(z)$ shown at 200 and 202 predicted by the basin simulation section 108 satisfactorily match the measured parameter values shown at 196 and 198 for the well.

Figure 11:
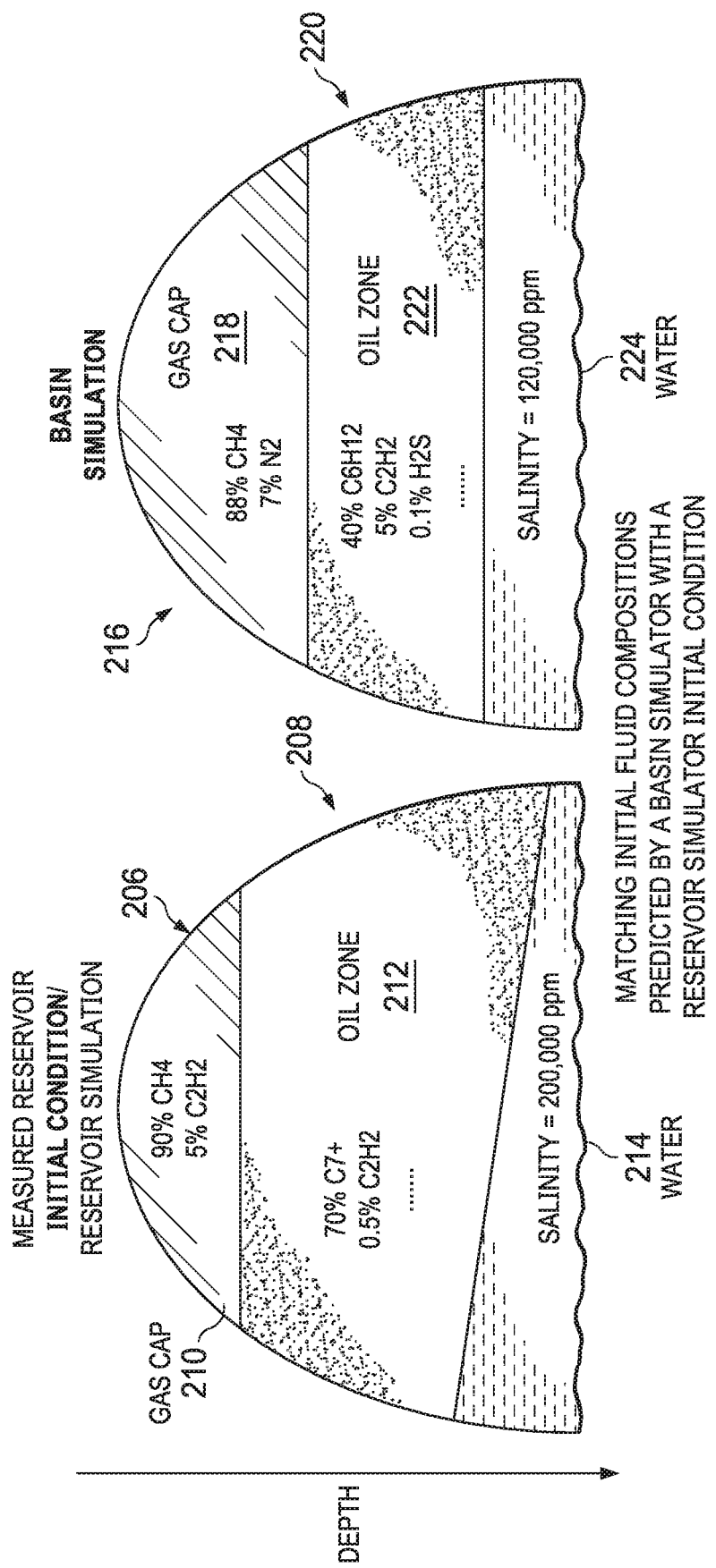
FIG. 11 is a schematic diagram illustrating initial fluid compositions obtained with a basin simulation section of the data processing system of FIG. 4 and initial fluid compositions obtained by a reservoir simulation section of the data processing system of FIG. 4.

FIG. 11 schematically illustrates at 206 and 208 tilted Gas Oil and Water Oil contacts, respectively, as functions of well depth which are available for the reservoirs obtained from the actual measurement by the wells drilled. FIG. 11 also shows at 206 initial fluid composition concentrations of a gas cap 210 and at 208 initial fluid composition concentrations of an oil zone 212. FIG. 11 further shows at 214 measured water salinity in water below oil zone. The fluid compositions 210, 212, and 214 represent initial conditions of reservoir simulation section 110 from fluid data relating to the producing reservoir R FIG. 11 as indicated at 156 in FIG. 5.

FIG. 11 also shows results of one of a number of simulation runs of the basin simulation section 108 are performed to provide different initial fluid compositions, such as initial fluid composition concentrations at 216 of a gas cap 218, initial fluid composition concentrations at 220 of an oil zone 222, and at 224 measured water salinity in water below the oil zone. As shown at 218 in FIG. 11, the initial basin simulation section 108 run may show a flat Gas Oil contact at different depth, and different gas and oil compositions as shown at 220 from initial conditions of reservoir simulation section 110 shown in FIG. 11. With the present invention, basin simulation section 108 is calibrated by changing certain reservoir attributes which affect the fluid level contact information and the fluid compositions until the results from basin simulation section 108 satisfactorily match field measurements provided from fluid data relating to the producing reservoir R included in the reservoir model.

Figure 12:
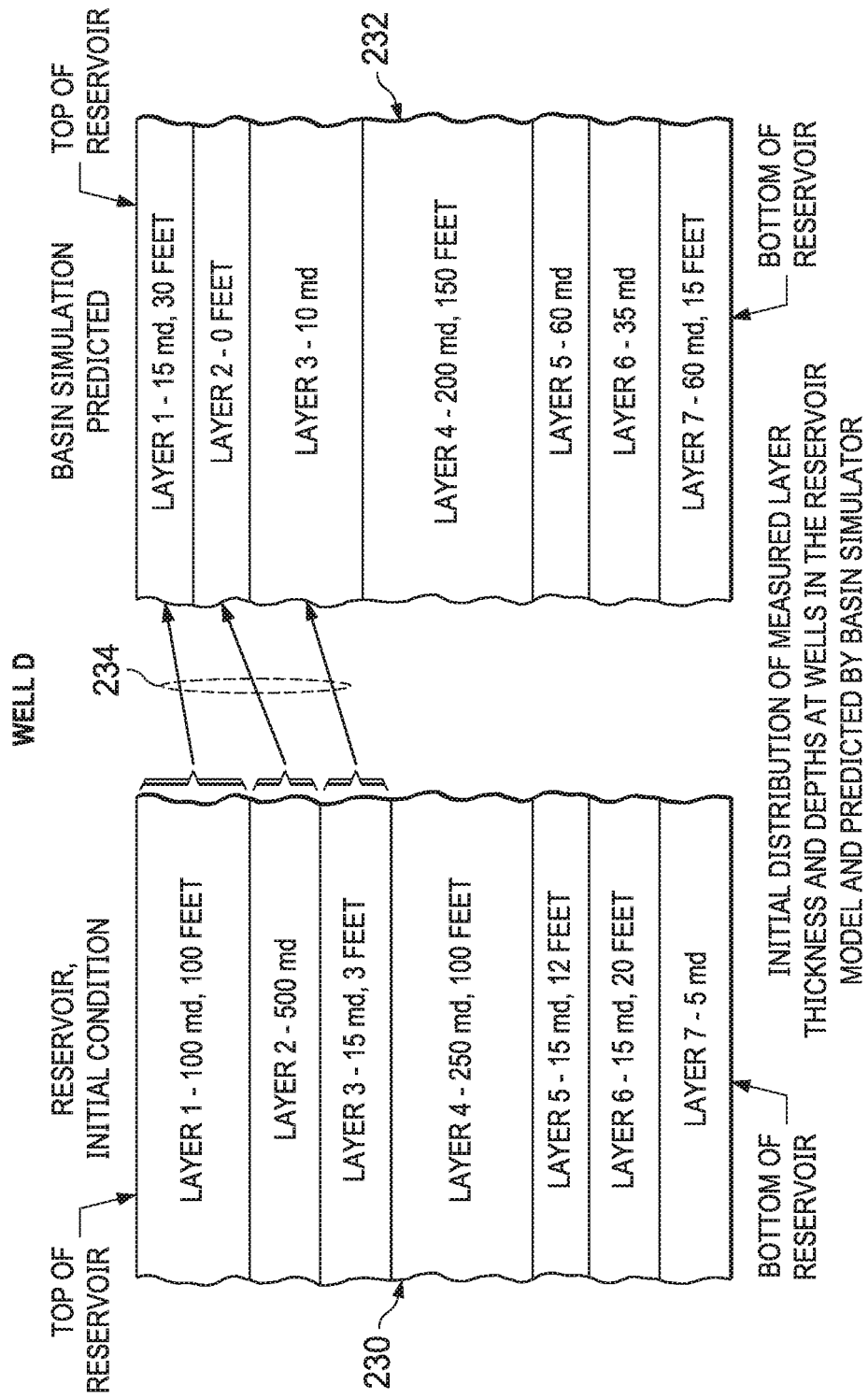
FIG. 12 is a schematic diagram illustrating an initial distribution of measured layer thicknesses and depths at a well in comparison with layer thicknesses and depths obtained with the data processing system of FIG. 4.

FIG. 12 illustrates schematically at 230 vertical layer thicknesses and permeability measures of the respective layers in a reservoir model based on measured quantities over depth intervals of interest for formation layers in an existing vertical well. FIG. 12 also shows at 232 vertical layer thicknesses and permeability measures of the respective layers predicted by the basin simulation section 108. As shown at 234 in FIG. 12, basin simulation section 108 initially predicts different depths, thicknesses and permeability for the reservoir than the reservoir values shown at 230. According to the present invention, basin simulation section 108 is calibrated as illustrated schematically in FIG. 4 by operation of the data processing system D until the results from basin simulation section 108 satisfactorily match actual depths, thicknesses and permeability measures for the reservoir.

Figure 13:
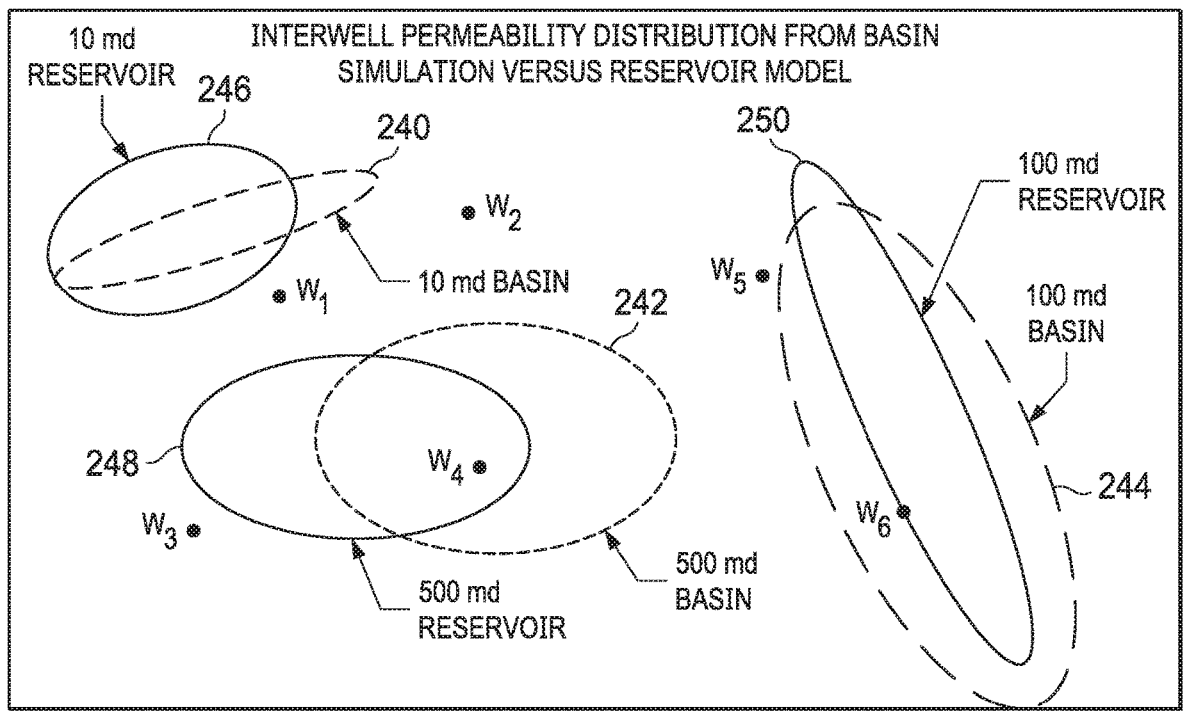
FIG. 13 is a schematic diagram illustrating an interwell permeability distribution of a subsurface formation layer in a reservoir model obtained with a basin simulation section of the data processing system of FIG. 4 in comparison with an interwell permeability distribution of the layer obtained with a reservoir simulation section of the data processing system of FIG. 4.

FIG. 13 is a diagram illustrating schematically at 240, 242, and 244 an interwell permeability distribution in a subsurface formation layer in regions near existing wells $W_1$, $W_2$, $W_3$, $W_4$, $W_5$, and $W_6$, in a reservoir model obtained with basin simulation section 108 of the data processing system of FIG. 4. FIG. 13 also shows at 246, 248, and 250 interwell permeability distribution of the same formation layer obtained with reservoir simulation section 110 of the data processing system of FIG. 4.

Figure 14:
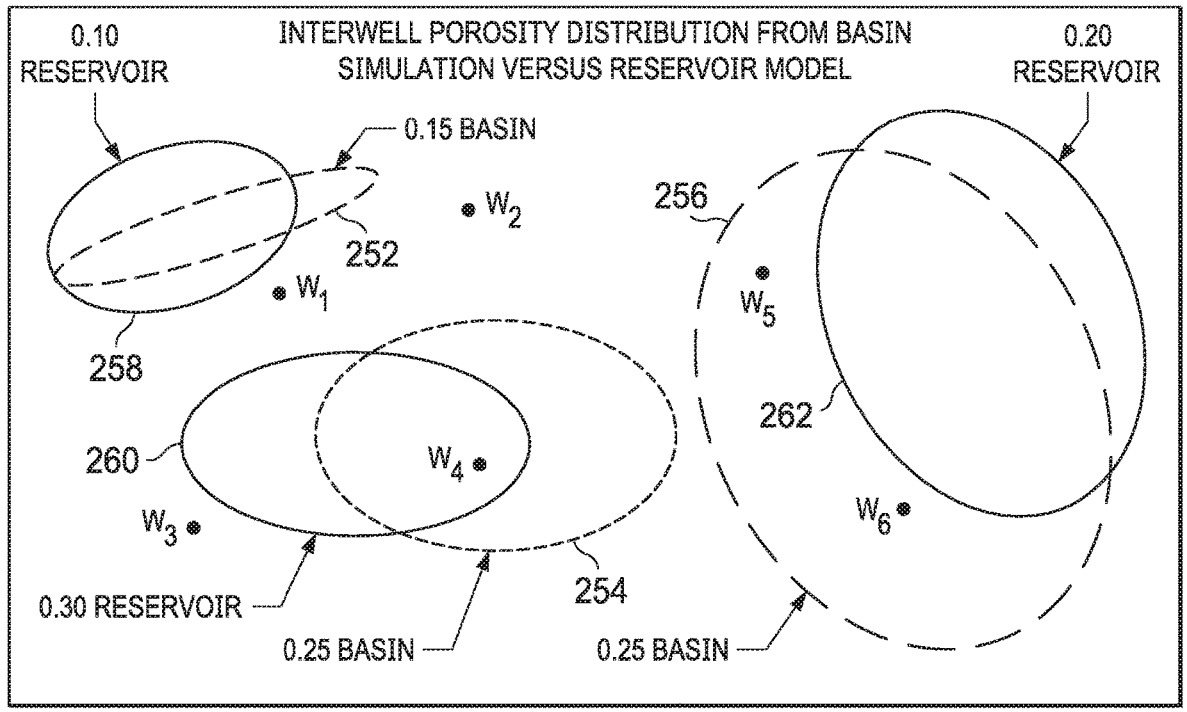
FIG. 14 is a schematic diagram illustrating an interwell porosity distribution of a subsurface formation layer in a reservoir model obtained with a basin simulation section of the data processing system of FIG. 4 in comparison with an interwell porosity distribution of the layer obtained with a reservoir simulation section of the data processing system of FIG. 4.

FIG. 14 is a diagram illustrating schematically at 252, 254, and 256 an interwell porosity distribution in a subsurface formation layer in regions near existing wells $W_1$ through $W_6$ in a reservoir model obtained with basin simulation section 108 of the data processing system of FIG. 4. FIG. 14 also shows at 258, 260, and 262 interwell porosity distribution of the same formation layer obtained with reservoir simulation section 110 of the data processing system of FIG. 4.

Figure 15:
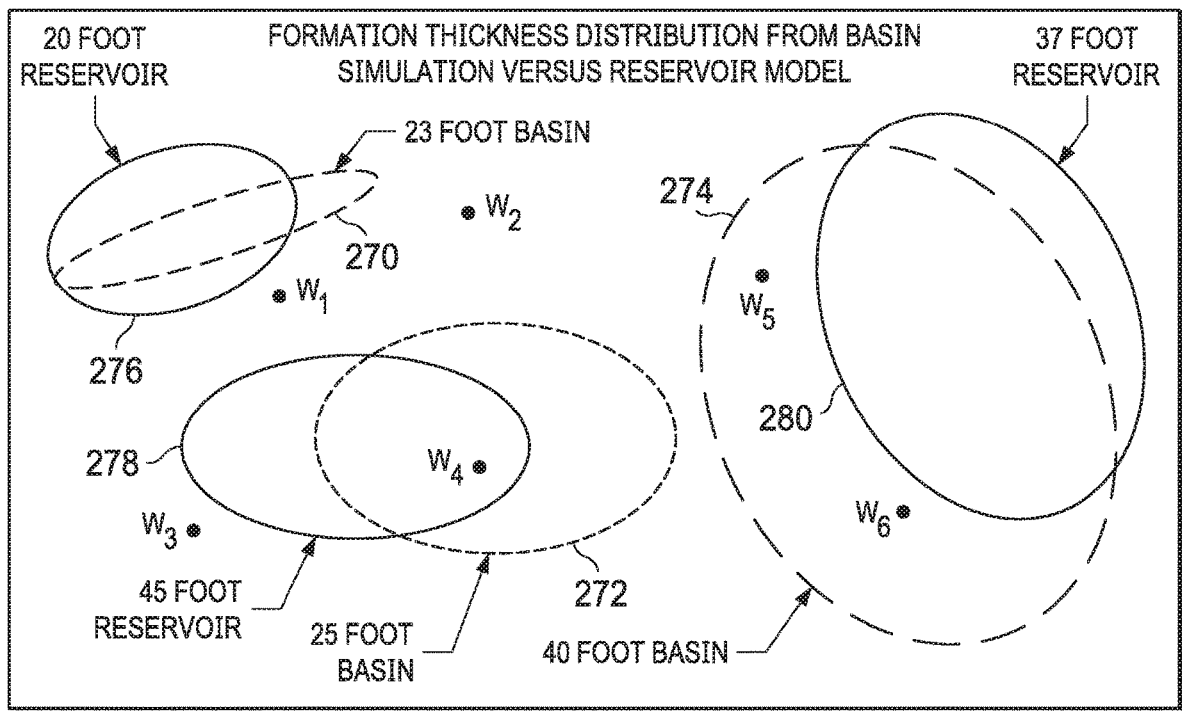
FIG. 15 is a schematic diagram illustrating a formation thickness distribution of a subsurface formation layer in a reservoir model obtained with a basin simulation section of the data processing system of FIG. 4 in comparison with a formation thickness distribution of the layer obtained with a reservoir simulation section of the data processing system of FIG. 4.

FIG. 15 is a diagram illustrating schematically at 270, 272, and 274 a formation thickness distribution in a subsurface formation layer in regions near existing wells $W_1$ through $W_6$ in a reservoir model obtained with basin simulation section 108 of the data processing system of FIG. 4. FIG. 15 also shows at 276, 278, and 280 a formation thickness porosity distribution of the same formation layer obtained with reservoir simulation section 110 of the data processing system of FIG. 4.

FIGS. 13 through 15 demonstrate areal distributions of reservoir properties of permeability, porosity, and formation thickness in the same interwell areas of the reservoir model by the basin simulation section 108 and reservoir simulation section 110. Since no physical measurement of subsurface parameters is possible in regions of the reservoir between wells, reservoir models depend on geostatistics to interpolate attribute values such as permeability, porosity, and formation thickness between the wells. Therefore the conceptual attribute contours for permeability, porosity, and formation thickness shown in FIGS. 13, 14 and 15 from reservoir simulation are estimated values based on geostatistics. In contrast, the basin simulation section 108 predicts areal distribution of permeability, porosity and formation thickness based on physical realities. Specifically, the reservoir attributes on which the basin simulation is performed are parameters which closely correspond to those which conform to geological history of the reservoir. Therefore a calibrated basin simulation section 108 most likely to predict more reliable areal property distribution.

Figure 16:
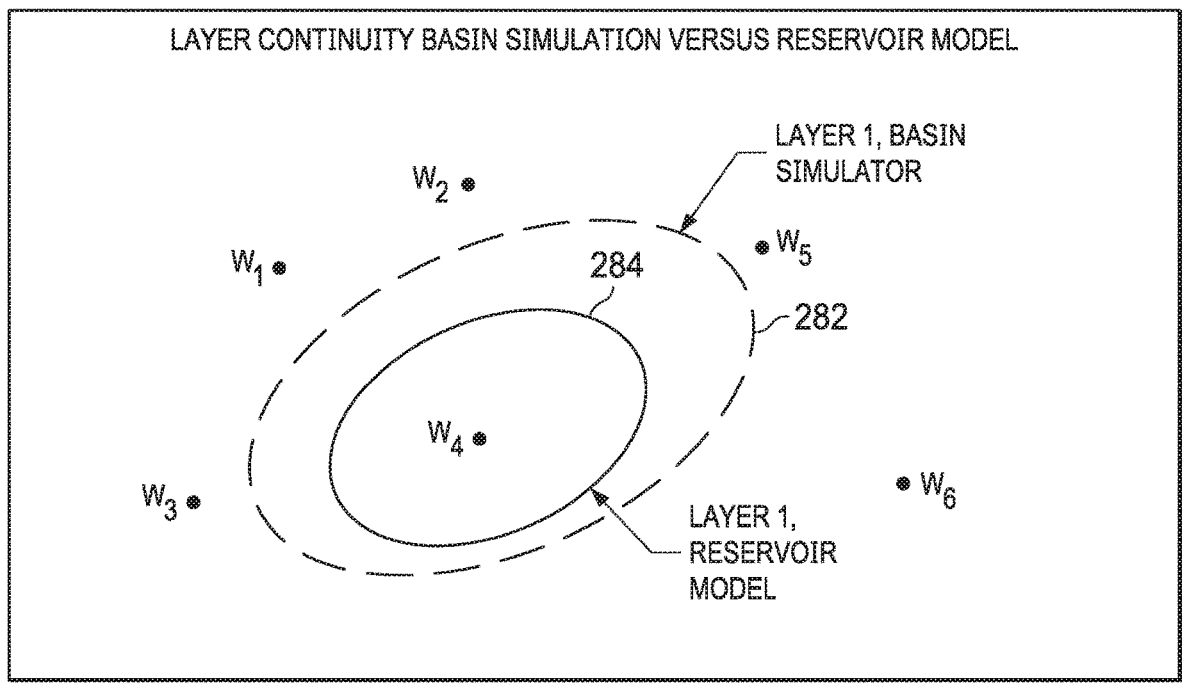
FIG. 16 is a schematic diagram illustrating layer continuity of a subsurface formation layer in a reservoir model obtained with a basin simulation section of the data processing system of FIG. 4 in comparison with layer continuity of the layer obtained with a reservoir simulation section of the data processing system of FIG. 4.

FIG. 16 illustrates at 282 and 284 areal layer continuity determined by basin simulation section 108 and reservoir simulation section 110, respectively, in the area of wells $W_1$ through $W_6$ in the reservoir model. In some reservoirs there are high permeability layers which come and go in the areal directions and similarly tight rock regions which are not continues but between the layers their locations are unknown. FIG. 16 illustrates the difference between two approaches. Here basin simulation section results 282 should not be matched to reservoir simulation section results 284 as was the case for vertically measured information, it rather provides another picture which can be used in calibration of the reservoir model. Basin simulation section 108 after calibrating against the measured data could provide valuable information about the areal extent of these zones.

Geological History Matching

Matching the basin simulator predicted formation and fluid properties to the measured initial condition or reservoir model initial condition can be done by changing values of the attributes of the basin simulator and making many runs.

This is a tedious process, resulting in inefficient use of computer processing resources and complicating computer operations. For this reason, the present invention provides a non-linear optimization methodology for solving the inverse problem by using a suitable non-linear optimization package or technique. The inverse problem for optimizing correspondence between formed predicted measures from the basin simulation section 108 and predicted measures from the reservoir simulation section 110 is performed by processor 102 minimizing an objective function $J(\vec{x}_B)$ according to Equation 1 below:

$$\min_{\vec{x}_B} J(\vec{x}_B) = \quad \text{Equation 1}$$

$$\sum_{w=1}^{n_w} W_P \{P^{res}[i(w), j(w), k(w)] \cdot P^{basin}[i(w), j(w), k(w)]\}^2 +$$

$$W_T \{T^{res}[i(w), j(w), k(w)] \cdot T^{basin}[i(w), j(w), k(w)]\}^2 +$$

$$W_{CH_4}\{C^{res}_{CH_4}[i(), j(w), k(w)] \cdot C^{basin}_{CH_4}[i(w), j(ww), k(w)]\}^2 +$$

$$W_{H_2S}\{C^{res}_{H_2S}[i(w), j(w), k(w)] \cdot C^{basin}_{H_2S}[i(w), j(w), k(w)]\}^2 +$$

$$W_{Co_2}\{C^{res}_{Co_2}[i(w), j(w), k(w)] \cdot C^{basin}_{Co_2}[i(w), j(w), k(w)]\}^2 +$$

$$W_h\{h^{res}[i(w), j(w), j(w)] \cdot h^{basin}[i(w), j(w), k(w)]\}^2 +$$

$$W_k\{k^{res}[i(w), j(w), k(w)] \cdot k^{basin}[i(w), j(w), k(w)]\}^2 +$$

$$W_\phi\{\phi^{res}[i(w), j(w), k(w)] \cdot \phi^{basin}[i(w), j(w), k(w)]\}^2 +$$

$$W_S \sum_{j=oil,h_2O,gas}^{3}$$

$$\{S^{res}_j[i(w), j(w), k(w)] \cdot S^{basin}_j[i(w), j(w), k(w)]\}^2 +$$

$$\sum_{i=1}^{nc-4} W_{C_i}\{C^{res}_i[i(w), j(w), k(w)] \cdot C^{basin}_i[i(w), j(w), k(w)]\}^2$$

Variables in Equation 1 are defined in the Nomenclature section above. The weighting factors are decided by the geoscientist who is conducting the study based on the amount of reliable data available and significance of the particular variable on objective function J. Alternatively they can be determined theoretically by conducting mathematical sensitivity analysis.

The values of the basin attributes for pressure, temperature, component fluid concentrations, rock formation parameters and grid fluid distribution identified in the objective function Equation 1 are determined by the basin simulation section 108. The basin simulator 108 and reservoir simulation section 110 according to the present invention are composed of the following components or sub-modules: Material Conservation (Component Mass Balance); Energy Balance; Fluid and Rock Property relationships; Thermodynamic Equations of State; and Chemical Reactions. The basin simulation section 108 and reservoir simulation section 110 determine fluid property distribution and reservoir rock properties over the reservoir model based on component mass balance relationships and energy balance relationships.

Set forth below are descriptions of the material and energy conservation relationships based on reservoir attributes and parameters which govern operation of simulation sections 108 and 110 and the chemical reactions during conversion of the kerogen into lighter molecular weight hydrocarbon components. In the source rock 44 when the organic material reaches maturation, it begins generating hydrocarbons. Initially, generated hydrocarbons are adsorbed by the source rock 44 until the source rock 44 is saturated. This phase is called primary migration. Many reservoir simulators use various forms of adsorption models. For the present invention, it is preferable to conduct experiments on rock samples and fit a standard adsorption model to the rock sample experiment results for as adsorption for the simulation sections.

On occurrence of saturation of source rock 44 with hydrocarbons from the kerogen, additional generated hydrocarbons are expelled. The additional generated hydrocarbons begin migrating in the earth crust in an upward direction due to buoyancy forces. This phase is called secondary migration. Set forth below are component mass balance and energy balance relationships of the secondary migration phase which is source responsible for filling subsurface hydrocarbon reservoir that are located and into which wells are drilled for petroleum to be produced Component Mass (or Mole) Balance Equations Given the history of deposition of layers, their properties, and thicknesses in a three dimensional space at time t during the deposition history, the mass (mole) conservation equations for any hydrocarbon or non-hydrocarbon component i is given, assuming movement in z direction only, and written in discrete form for the hydrocarbon or non-hydrocarbon component i as follows:

$$\sum_{d=1}^{3} \Delta T_d(x, y, z(t), p_{ob}(t), p) \sum_{j=1}^{n_p} \frac{n_{i,j}}{n_j} \rho_j \frac{k_{r,j}}{\mu_j} \Delta \phi_j + \quad \text{Equation 2}$$

$$q^{gen}i(x, y, z, t) - q^{loss}i(x, y, z, t) =$$

$$\frac{\Delta}{\Delta t}\left[V_B\left((x, y, z(t), t)\left\{\sum_{j=1}^{n_p} \phi(x, y, z(t), t), p_{ob}(t), p\right)\frac{n_{i,j}}{n_j}\rho_j\right.\right.$$

$$S_j + (1. - \phi(x, y, z(t), p_{ob}(t), p))\rho_r n_{i,r}\right\}\Bigg] +$$

$$q_i^{abs}i(x, y, z, t), n_i, T, p, n_p\Bigg) i = 1, \ldots n_c$$

where the fluid phase transmissibility $$T_{d_{i+\frac{1}{2}}}$$

is defined as for any direction d, between the grid blocks i and i+1 using grid centered finite volume approach as follows:

$$T_{d_{i+\frac{1}{2}}} = \frac{\bar{k}_{d_{i=\frac{1}{2}}} A_{d,i+1+\frac{1}{2}} \left(z_{d,i+\frac{1}{2}}(t)\right)}{d_{i+1} - d_i} \quad \text{Equation 3}$$

In Equation 3, $\bar{k}$ is the harmonic average of the absolute permeability at grid centers i and i+1. Absolute permeability is a function of overburden pressure and formation pressure. Similarly interface area A is a function of overburden pressure. Absolute permeability shrinks with higher overburden pressure as formation depths and numbers of layers accumulate.

Similarly, bulk volume in the accumulation term change since the grid block area perpendicular to flow changes (gets smaller) as the overburden pressure increases. Similarly porosity further gets changed because of the overburden pressure. Therefore, both absolute permeability and porosity are affected by the overburden and fluid pressures. Written in functional forms, permeability k and porosity $\Phi$ can be expressed as:

$$k = f_1(p_{ob(t)}, p; x, y, z(t))$$

$$\Phi = f_2(p_{ob(t)}, p; x, y, z(t))$$

and the interface area A between the grid blocks as:

$$A = f_3(p_{ob(t)}, p; x, y, z(t))$$

and the bulk grid block volume $V_B$ as:

$$V_B = f_4(p_{ob(t)}, p; x, y, z(t)) \quad \text{Equation 4}$$

Energy Equation—Component Heat Balance

The component heat balance relationship can be expressed as follows:

$$\sum_{d=x,z} \Delta \widetilde{T}_d (x, y, z(t), t) \Delta t + \quad \text{Equation 5}$$

$$\sum_{d=1}^{3} \Delta \widetilde{T}_d (x, y, z(t), t) \sum_{j=1}^{n_p} \frac{n_{i,j}}{n_i} \rho_j \frac{k_{i,j}}{\mu_j} \Delta h_j(T) +$$

$$q_u^{gen} i(x, y, z, t) - q_h^{loss} i(x, y, z, t) -$$

$$\left\{ \sum_{d=x,z} \Delta \widetilde{T}_d (x, y, z(t), t) \Delta T \right\}_{OB} +$$

$$\left\{ \sum_{d=x,z} \Delta \widetilde{T}_d (x, y, z(t), t) \Delta T \right\}_{UB} =$$

$$\frac{\Delta}{\Delta t} \left[ V_B \left( (x, y, z, (t), t) \left\{ \sum_{j=1}^{n_p} \phi(x, y, z(t), p_{ob}(t), p) \frac{n_{i,j}}{n_i} \rho_j \right. \right. \right.$$

$$h_j(T) + (1. - \phi(x, y, z(t), p_{ob}(t), p))$$

$$\rho_r h_r(T) \Big) \Big] \; i = 1, \ldots n_c$$

where $\widetilde{T}$ is the thermal conductivity based transmissibility defined similar to Equation 3, but with K representing the thermal conductivity of the formation rock.

In Equation 5, h stands for the specific enthalpy, and the variables are as defined in the nomenclature.

Transforming Kerogen into Lighter Hydrocarbons

In Equation 6 below, $n_c$ describes the number of hydrogen components. The transforming kerogen into lighter hydrocarbons at the source location 44 can be demonstrated as a concept for two hydrocarbon components. Let $n_{HO}$ represent the heavy components and $n_{LO}$ to represent the light components, as follows:

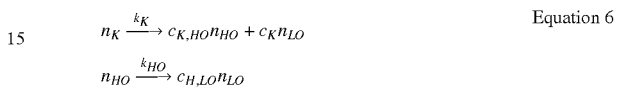

$$n_{HO} \xrightarrow{k_{HO}} c_{H,LO} n_{LO}$$

Equation 6

In Equation 6, subscript K stands for Kerogen, HO for Heavy Oil, LO for Light Oil, $n_{HO}$ represents the number of mole fraction (concentration) of Heavy Oil in the mixture of Heavy Oil and Light Oil.

$$\frac{dn_K}{dt} = -k_K n_K \quad \text{Equation 7}$$

$$\frac{dn_{HO}}{dt} = c_{K,HO} k_K n_K - k_{HO} n_{HO}$$

$$\frac{dn_{LO}}{dt} = = c_{K,LO} k_K n_K + c_{HO,LO} k_{HO} n_{HO} \quad \text{Equation 8}$$

$$n_k(0) = n_{K0}$$

$$n_{HO}(0) = n_{H0}$$

$$n_{LO}(0) = n_{L0}$$

Reaction rate constants can be determined from the experiments or calculated from the Arrhenius equation:

$$k_{KO} = A_{HO} e^{-\frac{E_{HO}}{RT}} \quad \text{Equation 9}$$

where $E_{HO}$ is the Activation Energy, T is the absolute temperature, R is the universal gas constant, and A is the constant for the reaction.

In Equation 7 $c_{k,HO}$ and $c_{HO,LO}$ are the stoichiometric coefficients determined from the experiments. For a given temperature T, Equations 7, 8 and 9 form a set of linear coupled ordinary differential equations which can be solved uniquely for $n_K(t)$, $n_{HO}(t)$, $n_{LO}(t)$ for $0 \le t \le T_{final}$ where $T_{final}$ is the final simulation time. Equation 7 assumes that analytical solution is to be performed.

Kerogen:

$$n_K(t) = n_K(0) e^{-k_k t} \quad \text{Equation 10}$$

Heavy Component:

$$n_{Ho}(t) = \left[ n_{Ho}(0) - \frac{c_{k,ho} k_K n_K(0)}{k_{Ho} - k_k} \right] e^{-k_{ho} t} + \left[ \frac{c_{k,ho} k_K n_K(0)}{k_{Ho} - k_k} \right] e^{-k_k t} \quad \text{Equation 11}$$

Light Component:

$$n_{Lo}(t) = n_{Lo} + \frac{A_1}{k_k}(1 - e^{-k_k t}) + \frac{A_2}{k_{Ho}}(1 - e^{-k_{Ho} t})$$ Equation 12

$$A_1 = C_{k,lo} k_k n_k(0) + \frac{c_{ho,lo} k_{Ho} c_{k,ho} k_k n_k(0)}{c_{Ho} - k_k}$$

$$A_2 = C_{ho,lo} k_{Ho} n_{Ho}(0) + \frac{c_{Ho,lo} k_{Ho} c_{k,ho} k_k n_k(0)}{c_{Ho} - k_k}$$

In the basin simulation section 108, Equations 7, 8 and 9 are solved for each grid block for the temperature T(i, j, k, t). Therefore, it is helpful to know how many moles of HO and LO moles generated at that time step of the basin simulation. The mixture of HO and LO moles at that P, and T will be either liquid or liquid and gas, or if too hot entirely gas (depending on the molecular weight of HO). This can be determined by a flash calculation procedure. As has been described (FIG. 3), the generated HO and LO travel in the most possibly water wet porous media to a higher elevated locations in the basin due to buoyancy forces.

Prediction of New Oil & Gas Accumulations (Reservoirs)

Once a satisfactory match is formed between predicted measures from the basin simulation section 108 and predicted measures from the reservoir simulation section 110 obtained by the processor 102 in the geological history matching, basin simulation section 108 is used as indicated at 160 to locate additional conventional and unconventional oil and gas fields.

In addition, basin simulation section 108 is used to estimate how much more hydrocarbons that the source rock location 44 contains and will be able to locate additional unconventional reserves. Conventional reservoirs are the typical present hydrocarbon reservoirs where oil and gas are generally found trapped in dome type structures under the ground. Conventional hydrocarbon reservoirs are formed as a result of the migrating hydrocarbons from the source rock, or kitchen, after generation from kerogens. The source rock generates hydrocarbon under the pressure and temperature by cooking the organic material. A large amount of generated hydrocarbons in the source rock is adsorbed by the rock called primary migration. Upon the saturation of the source rock with the hydrocarbon, additional generated hydrocarbons migrate upward in the earth subsurface structure due to buoyancy forces. The migrating hydrocarbons become trapped in today's known conventional, usually dome type structures. The source rock however may contain vast amounts of oil or gas in an adsorbed state. The source rock formations with adsorbed hydrocarbons are called unconventional reservoirs. It is of economic interest to drill and produce the trapped hydrocarbons in the source rock (unconventional reservoirs).

Figure 17:
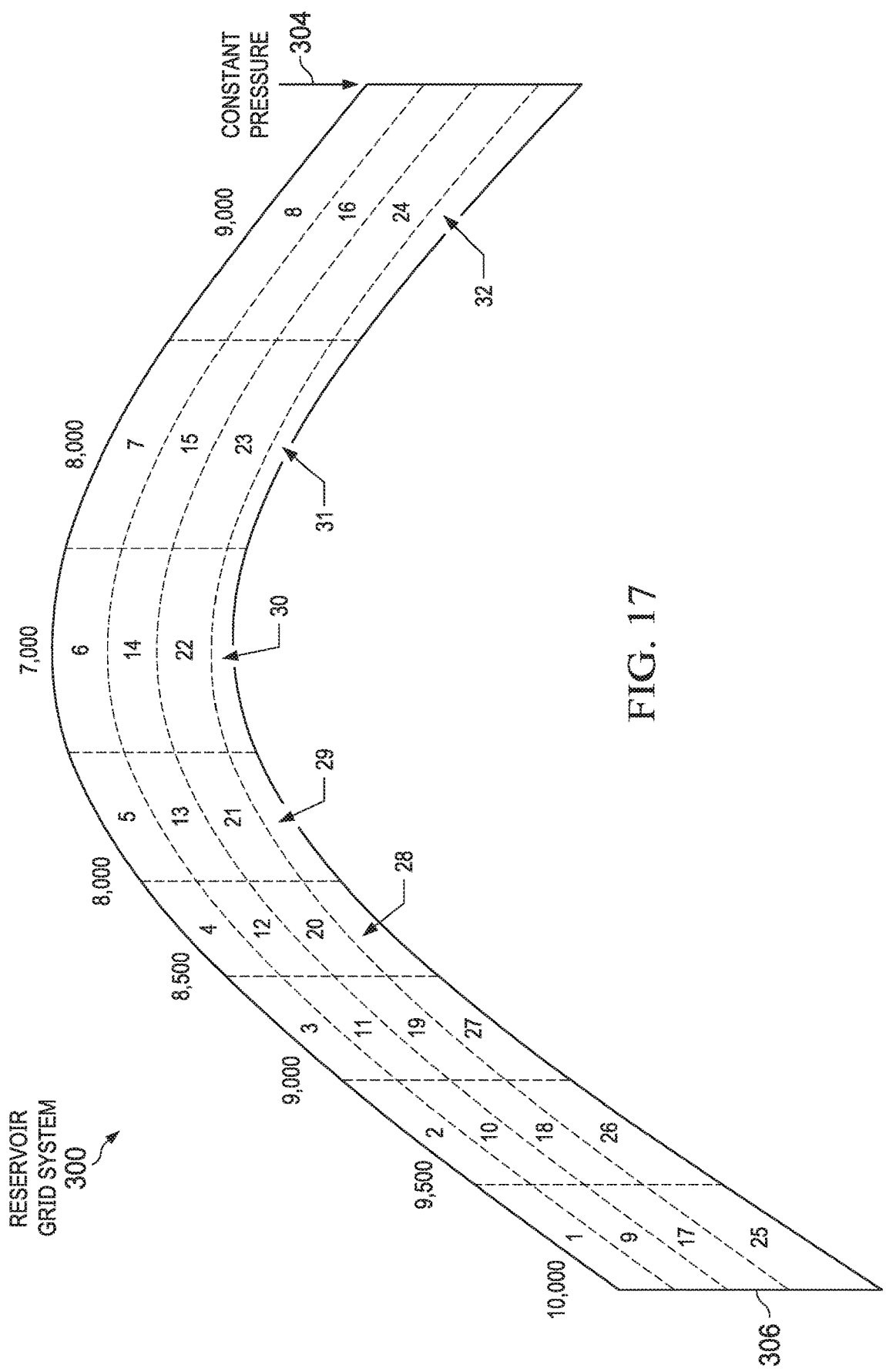
FIG. 17 is a schematic diagram of an example reservoir grid system in a vertical plane of a three dimensional reservoir model of subsurface formations in the earth for hydrocarbon migration with the data processing system of FIG. 4.

A synthetic model 300 was built to confirm the operational methodology of a data processing system D according to the present invention. The model assumed a vertical cross section of underground layers where the hydrocarbon generation and migration is to take place. The model was a two-dimensional section with dimensions of about 24,000 ft. long in the x direction and 400 ft. thick in the vertical or z direction (FIG. 17). The vertical cross section was further divided into 8 grid cells or blocks in the x direction and 4 grid blocks (layers) in the vertical direction. Each grid block or cell thus had dimension of 3,000 ft. by 100 ft. with exception of a trap 302 (FIG. 18) or highest location representing a porous media with 50 ft. thick. Most of the grid blocks were assumed having low porosity in the order of 1 percent. The trap 302 in the synthetic model 300 was assigned a porosity of 20 percent, while a grid block below the trap was assumed have 5 percent porosity.

Figure 18:
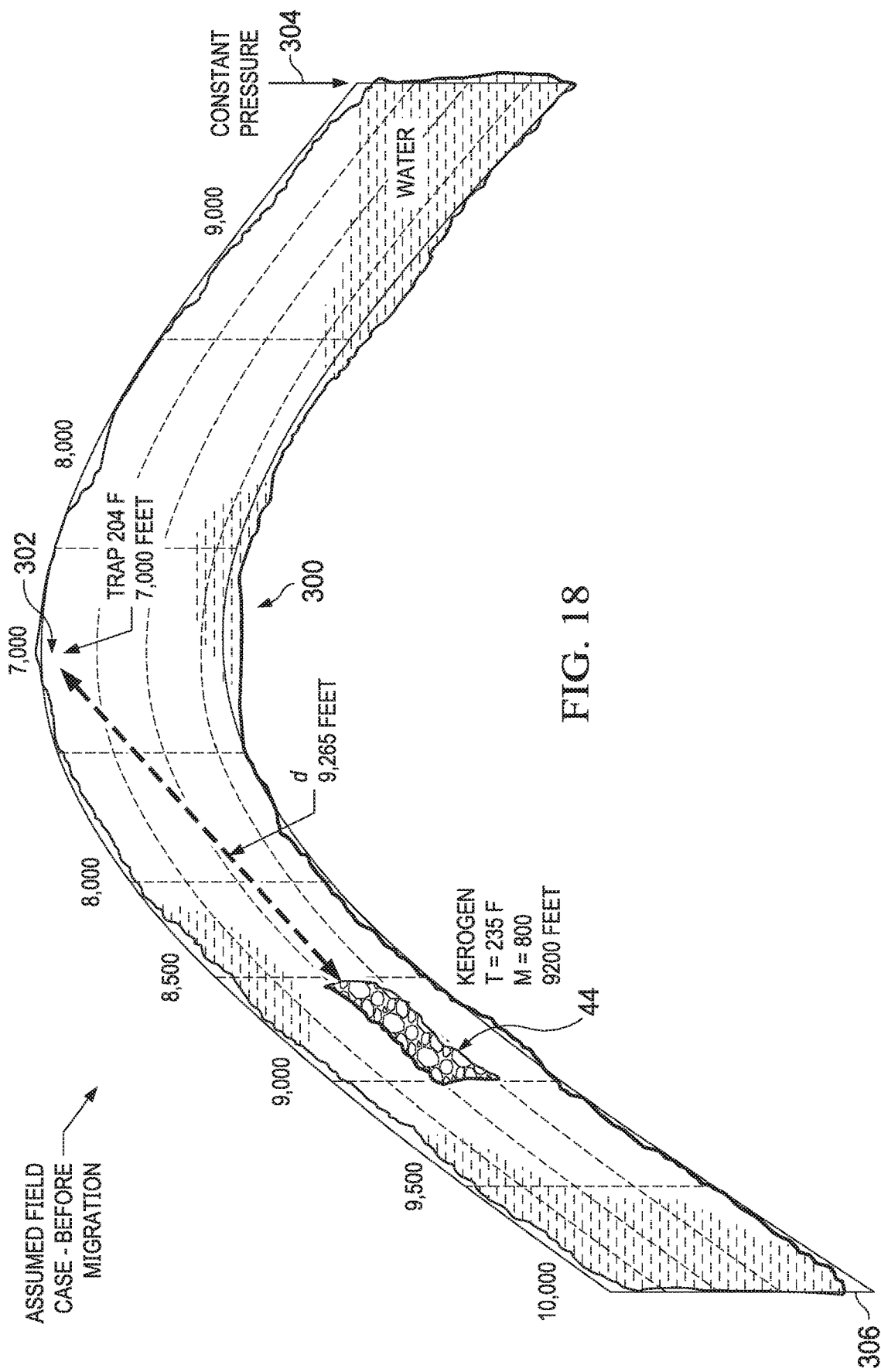
FIG. 18 is a schematic diagram of an example assumed field case in the reservoir grid system of FIG. 17 before hydrocarbon migration with the data processing system of FIG. 4.

In the model 300 which is the subject of FIGS. 17 and 18, there was assumed to be no flow boundary (sealed) condition except the right-most boundaries of the layers were kept at constant pressure as indicated at 304 allowing hydrocarbons and water in an east boundary 306 to escape.

System temperatures were assumed initially to be those of the geothermal gradient but susceptible to change during the migration. There was assumed to be no adsorption (primary migration) at the source rock and migration path for the hydrocarbons. The rock media in the model was assumed to be hundred percent saturated by water (representing basin layers were deposited under the water during the formation of the basin).

A control volume finite difference simulator performing as described by Equations 2, 3, 4 and 5 was run for various migration cases. The simulator is a multiphase two-hydrocarbon component and water component three-dimensional simulator using the Darcy's law for the fluid flow.

Example of Locating Kerogen

To illustrate an example of locating a kerogen source such as source region 44, the variables in Equation 1 were reduced to Oil Saturation $S_o$ only.

$$\min_d J(d) = \Sigma_{K=1}^{K} \{S_{o,t,k}(d) - 1.75\}^2$$ Equation 13

In Equation 13, k represents a trial run number, K is the total number of trial runs, d represents the unknown distance between the trap 302 and the kitchen (kerogen) source region 44, and $S_{o,t,k}$ (d) is the Oil Saturation at the trap 302 calculated by the basin simulator for a given value of d. J(d) is the least squares objective function with respect to d.

The objective is to find a value for unknown distance d during optimization operation 158, which minimizes J(d). Expanding J(d) in a Taylor series around the estimate $d^{\upsilon+1}$ where $\upsilon$ represents the iteration level:

$$J(d)^{\upsilon+1} = J(d)^{\upsilon} + \left[\frac{\partial J(d)}{\partial D}\right]^{\upsilon} \delta d$$ Equation 14

$$J(d)^{\upsilon} + 2\{S_{o,t,k}(d) - 0.484\}^{\upsilon} \frac{\delta S_{o,t,k}(d)^{\upsilon}}{\partial d} \delta d$$

Setting the right hand side to zero, one can obtain $$\delta d = \frac{-J(d)^{\upsilon}}{2\{S_{o,t,k}(d) - 0.484\}^{\upsilon} \frac{\delta S_{o,t,k}(d)^{\upsilon}}{\partial d}}$$ Equation 15

Rearranging Equation 15 one obtains $$d^{\upsilon+1} = d^{\upsilon} - \frac{J(d)^{\upsilon}}{2\{S_{o,t,k}(d) - 0.484\}^{\upsilon} \frac{\partial S_{o,t,k}(d)^{\upsilon}}{\partial d}}$$ Equation 16

Iterations for optimization operation 158 (FIG. 5) of processor 102, stop as indicated at 160 when:

$$|\delta d| \leq \varepsilon$$ Equation 17

Model Example—Hypothetical Field

FIG. 18 illustrates the kerogen source location 44 located a distance from a potential trap 302 which is the highest location of interest in the reservoir structure for the model 300. The kerogen source location 44 is located at 9,200 ft. depth below the earth surface and the potential trap 302 is located at 7,000 ft. below the earth surface. The distance in the model 300 of FIG. 18 between a central point of kerogen grid block (i=3 (x direction index; i=1, 8); and layer=3) and a center of the trap 302 (which is located in x direction with i index=6 and layer=1) is 9,265 ft.

In the model of FIG. 18, the kerogen temperature is 235° F. and trap temperature is 204° F. The system was assumed at hydrostatic equilibrium with geothermal temperature gradients. To solve the temperature equation for each time step, five unequal layers were added to the top of the reservoir (logarithmically spaced to account heat flow properly) and five layers were added to the bottom of the reservoir (4th reservoir layer).

Each reservoir was assumed to have constant horizontal permeability of 1.5 Darcy, while the vertical permeability was set to 15 mD. Varying high permeability was selected at the top layer from 1 to 6 D. Porosity of the layers except the trap block 300 was assumed to be 1 percent, while the trapped area porosity was set to 20 percent.

Base Case Model Results

Figure 20:
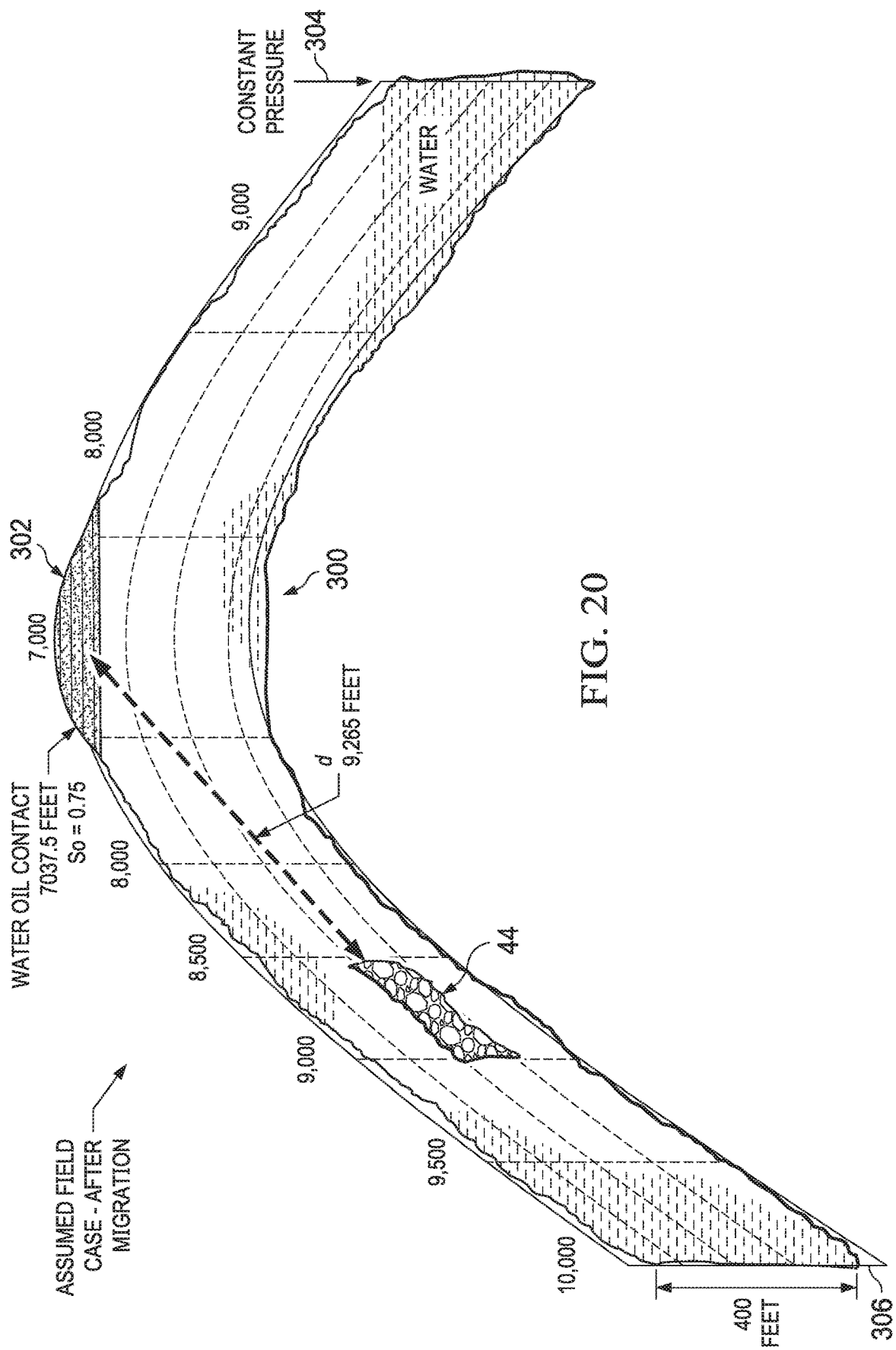
FIG. 20 is a schematic diagram of the example assumed field case of FIG. 18 after hydrocarbon migration with the data processing system of FIG. 4.

For a simplified base case model with a liquid oil reservoir formation, the data processing system D was run for an example case where Heavy Oil and Light Oil were generated as kerogen was decomposing in time (FIG. 3). As described above, a generated mass (or moles) of light and heavy hydrocarbons leaves the kitchen 44 and begins moving (FIG. 18) under the buoyancy forces vertically to the top of the structure of model 300 (FIG. 20). As the oil moves upwardly it displaces formation water. The displaced water leaks from the structure at east boundary 306.

Example results from the data processing system D showed that at the end of hydrocarbon generation and migration, trap 302 was filled with oil above its bubble point. FIG. 20 shows that a new oil field was formed with a Water/Oil contact at 7037.5 ft. The Oil Saturation $S_o$ in grid block which represents the trap 302 in the model is 0.75. API gravity of the oil was 38.1, with bubble point pressure of 667 psi, and with a light end mole fraction (composition is 0.45). Trap oil pressure was 3730 psi.

Figure 19:
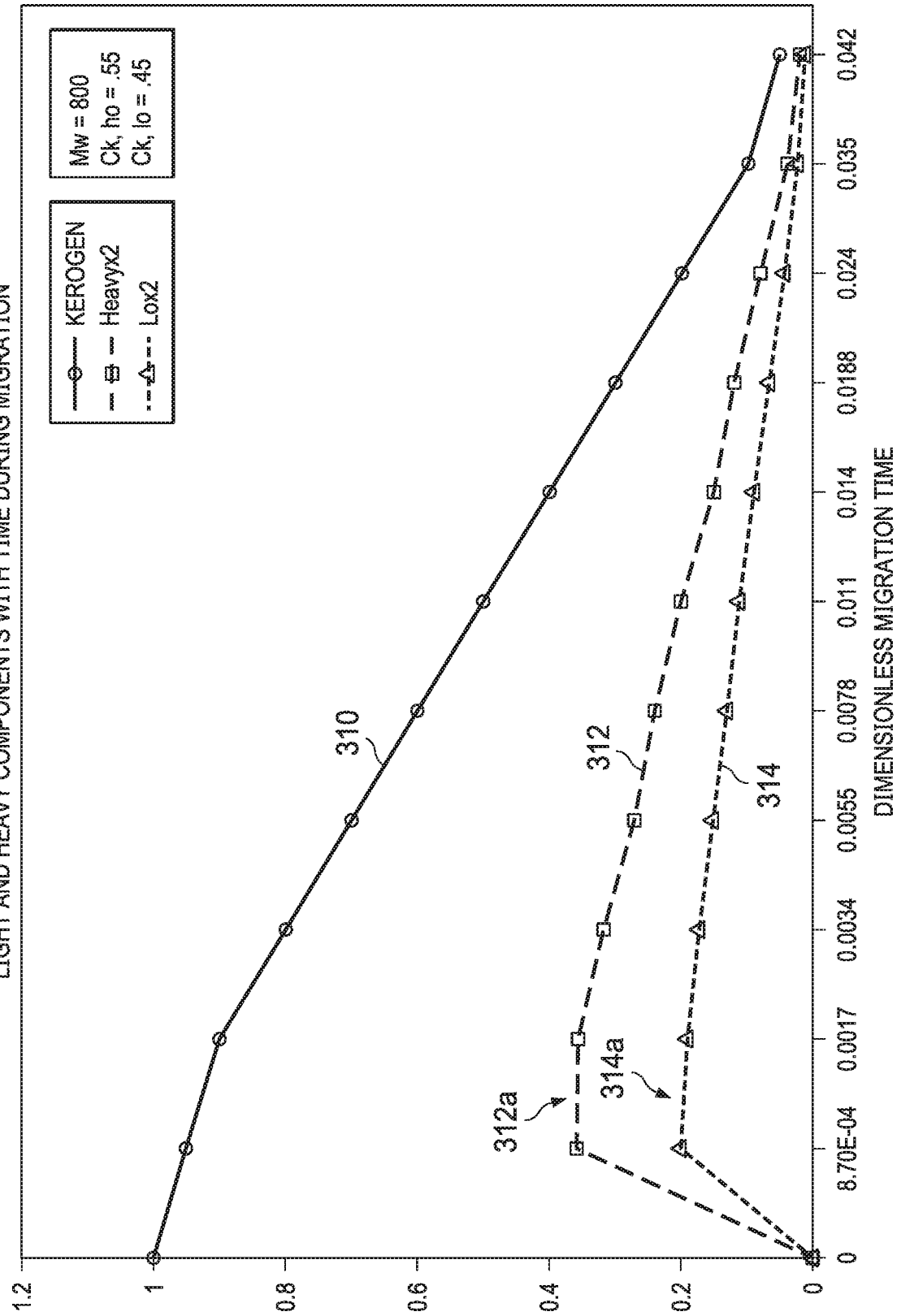
FIG. 19 is a plot of relative reduction in kerogen mass and generation of light and Heavy Oil components with time during migration with the data processing system of FIG. 4.

The trapped hydrocarbon properties are the results of the kerogen decomposition. The stoichiometric coefficients, C, are shown in FIG. 19. As shown in FIG. 19, molecular weight of the kerogen is 800 lb./lb-mole, stoichiometric coefficients for conversion of kerogen to Heavy Oil component is 0.55, and for conversion of kerogen to Light Oil is 0.45 (Equations 6 and 7). FIG. 19 shows that at the initial state for migration time=0, before the hydrocarbon generation starts, total kerogen mass as indicated at 310 is 1 in dimensionless units. As the kerogen generation progresses in time, the amount of kerogen mass in the source rock decreases (less than 1), and a mass of Heavy Oil as indicated at 312 and a mass of Light Oil as indicated at 314 are generated. As also seen from FIG. 19, heavy and Light Oil generation reaches a maximum as indicated at 312a and 314a, respectively. Subsequently. Heavy Oil and Light Oil generation start declining as the total amount of kerogen declines in the source rock.

If the kerogen generates more Light Oil after the trap 302 is filled, the trap 302 in the model 300 should become filled with more Light Oil and eventually a gas cap can form or could be entirely gas reservoir at the trap 302. In this example, as noted, a liquid oil reservoir formation was selected as a simplified illustrative example.

Further Model Results

Figure 21:
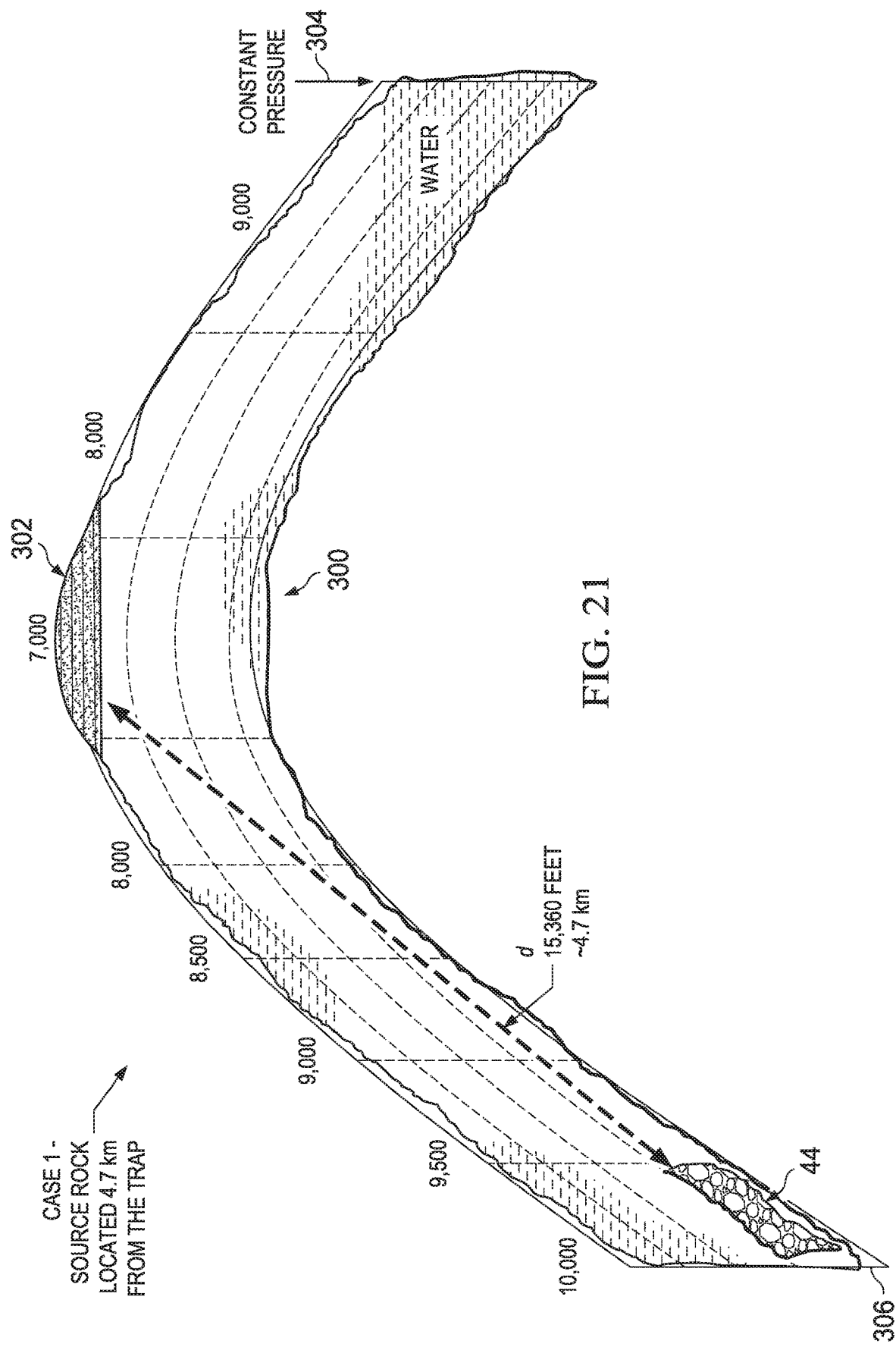
FIGS. 21, 22, 23 and 24 are schematic diagrams of the effect on Oil Saturation in the field case of FIG. 20 of different original locations for an original kerogen generation site.
Figure 22:
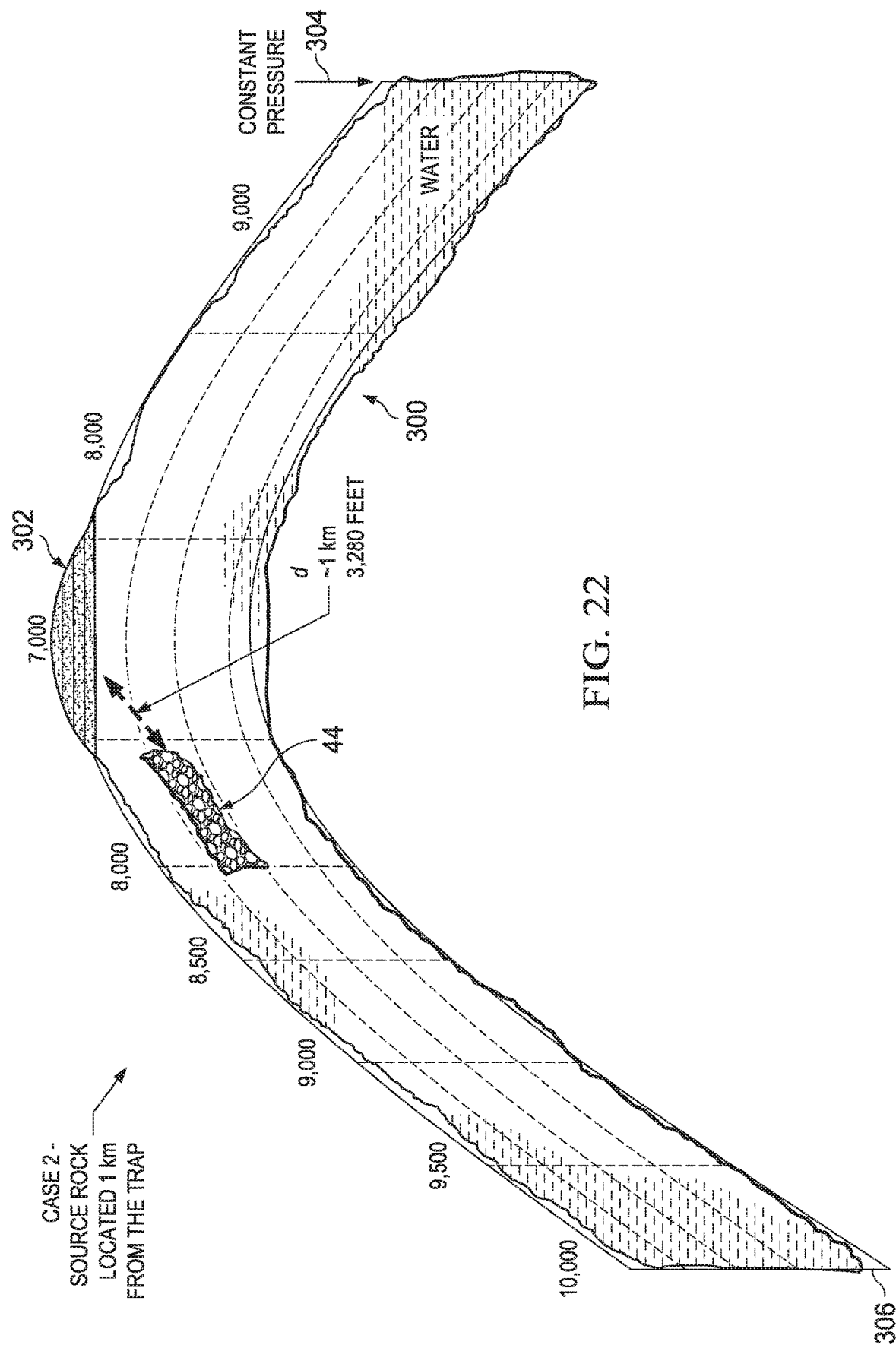
Figure 23:
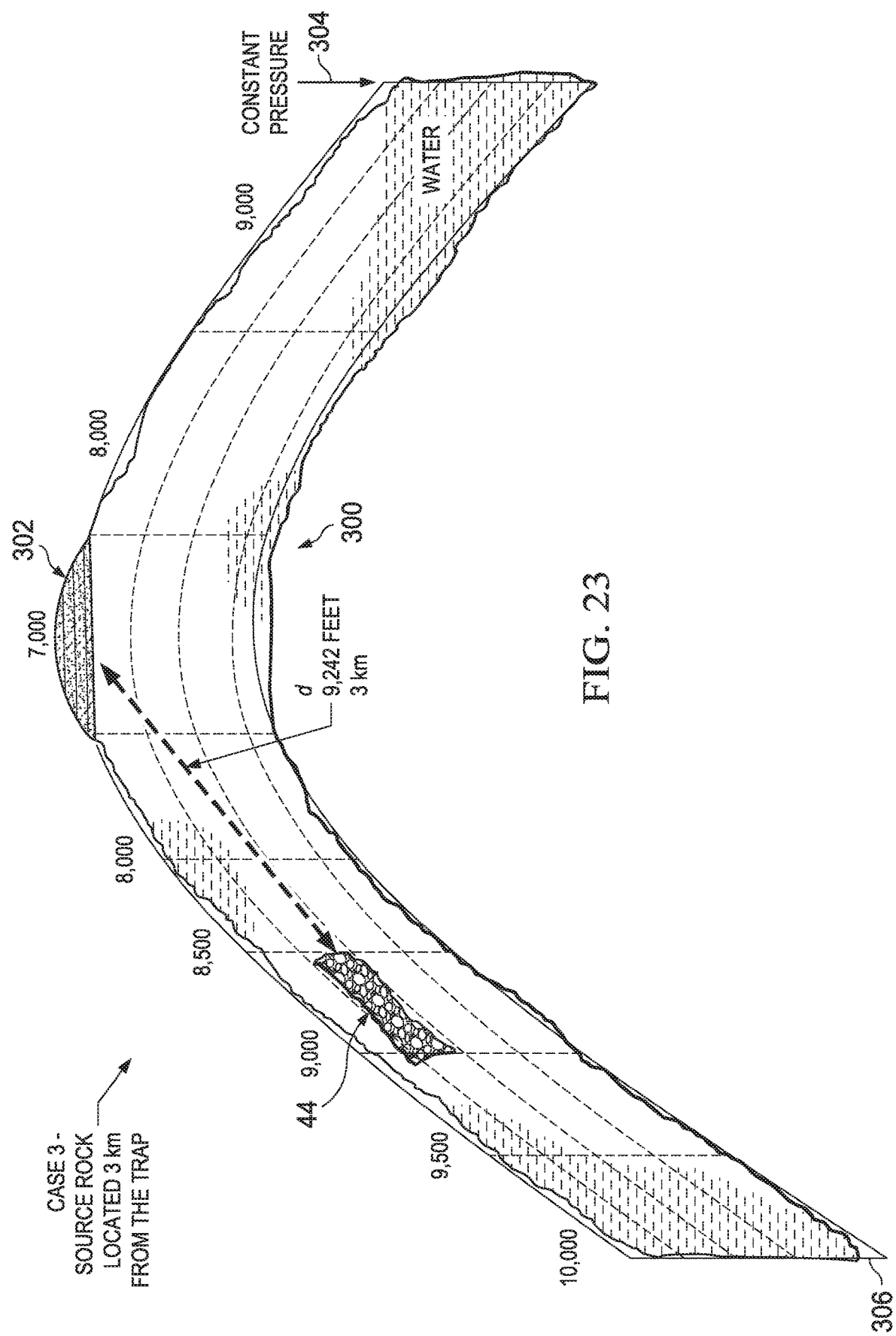
Figure 24:
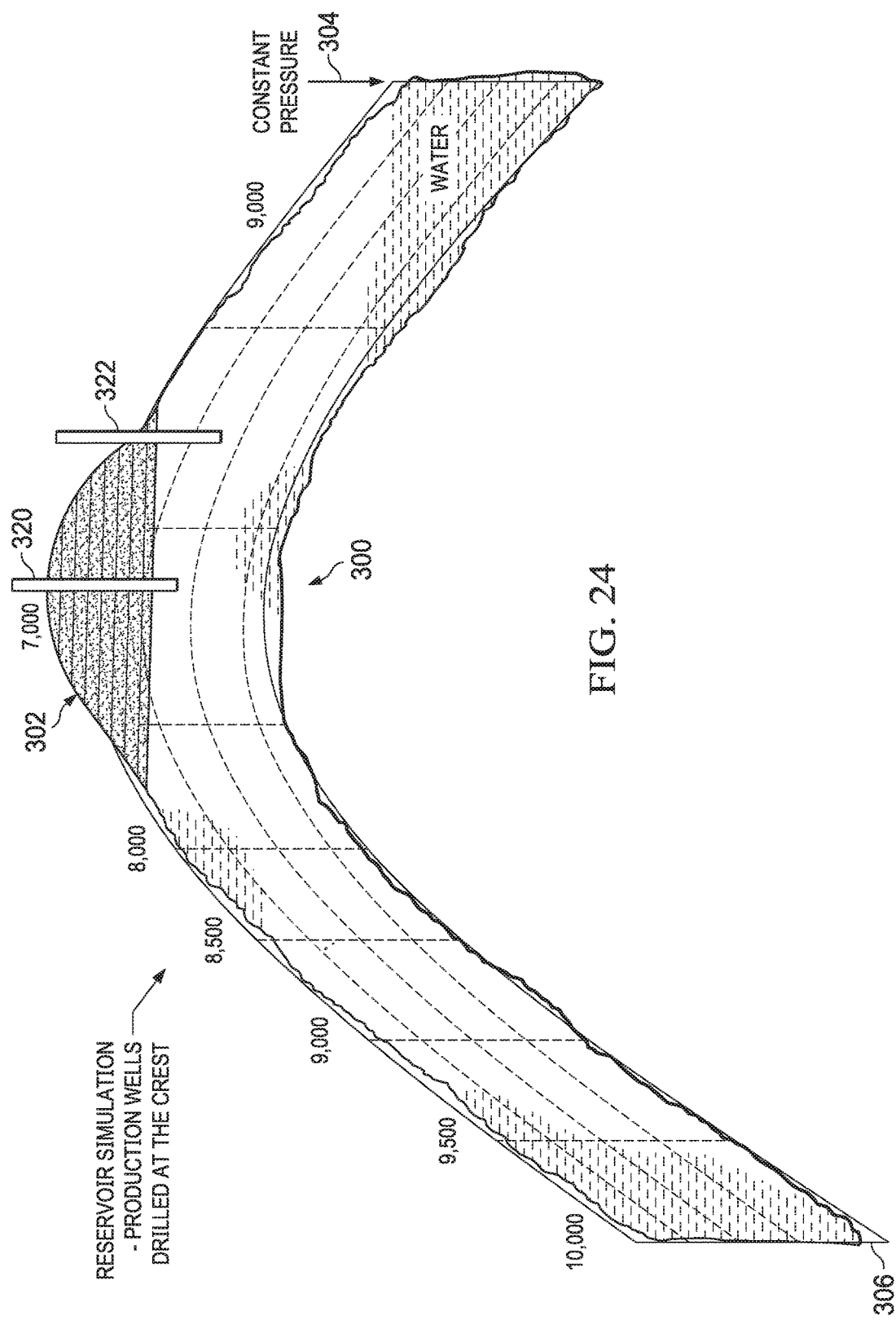

Several runs of the data processing system D using the control volume finite difference simulator performed to Equations 2, 3, 4 and 5 were made for the model of FIG. 18 by locating the kitchen (Kerogen) 44 at different locations and predicting Oil Saturation $S_o$ at the trap 302. Results of three of the runs are illustrated by FIGS. 21, 22 and 23. As seen in FIG. 21, it was first assumed that the kitchen 44 is located far from the trap, 4.7 km away. This case resulted in trap Oil Saturation $S_o$ of 60%. Next the kitchen 44 was assumed to be approximately 1 km away, (FIG. 22). This case resulted in trap Oil Saturation $S_o$ of 86 percent. In Case 3, the kitchen 44 was moved to 3 km away from the trap 302 (FIG. 24). For Case 3, the trap Oil Saturation $S_o$ calculated was 0.76. More runs were made by changing the location of kitchen and computing the trap Oil Saturation.

A quadratic function was fitted to the determined results for source locations obtained by runs of the data processing system D in this manner for a number of locations of the kitchen 44. The resultant fitted quadratic function defines the relationship which analytically describes the trapped Oil Saturation $S_o$ and the distance d between the trap 302 and kitchen 44 in the model 300 of FIG. 18. The relationship between trapped Oil Saturation $S_o$ and the distance d is set forth in Equation 18:

$$S_o(d) = 0.788 + 3.1610^6 d \cdot 7.9410^{10} A^2; \text{ and} \qquad \text{Equation 18}$$

$$\frac{\partial S_o}{\partial d_o} = 3.1610^6 - 7.9410^{10} A$$

Substituting Equation 18 into Equation 16 and assuming a starting value for d=1,000 ft. results in the following table:

| Iteration No. | d, ft. - Distance to Kitchen | Error |
| --- | --- | --- |
| 1 | 9,642. | 8.2E−5 |
| 2 | 9,450. | 2.06E−5 |
| 3 | 9,351. | 5.5E−6 |
| 4 | 9,300. | 1.4E−6 |
| ... | ... | ... |
| 8 | 9,250. | 3.46E−10 |

Further iterations and application of Equation 18 estimated that the kitchen 44 was located at a distance of about 9,250 ft. away from the trap 302 which is only 14 ft. off from the 9.265 ft. (FIG. 18) determined for the base model.

The foregoing example based on Oil Saturation alone was used as an illustrative model example. In actual field cases more variables shown in Equation 1, such as composition, temperature, fluid properties and other basin attributes identified in Equation 1 should be matched to improve the accuracy of the determined location of a kerogen source location.

Simulation of Future Reservoir Performance

Equations 2 through 5 above also describe the fluid flow in a reservoir. Therefore, the reservoir simulation section 110 can be used as indicated at 162 to predict future performance of the reservoir, again using trapped oil. An illustrative model shown in FIG. 24 is provided. To illustrate simulation of future reservoir performance, two production wells 320 and 322 were assumed to have been drilled in the oil trap 302 (x grid location, i=6 and i=7, layer 1-top layer in FIG. 24). The reservoir simulation section 110 was then run to predict reservoir performance.

Wells 320 and 322 were put on production and their performance was determined. The determined results obtained are plotted as functions of future reservoir time in FIG. 25. FIG. 25 is an output display plot of predicted performance (Pressure indicated at 324; Oil Production Rate at 326; and Water Cut at 328) of wells as a function of reservoir production time which starts at the date which the reservoir wells were put on production. Prediction performance is done by using the reservoir simulation section 110 of the simulator 106 simulation of the data processing system of FIG. 4. For example, the reservoir simulation can be run for recent or current years, such as 1960 or 2017, while basin simulation begins in geological time, i.e., 500 million years ago and stops at the present time (2017).

FIG. 25 is a plot of results indicating that the same grid system used by basin simulation section 108 for basin simulation can be used for reservoir simulation. As shown in FIG. 5 the reservoir simulation section 110 can be run as indicated at 162 using the calibrated attributes determined during step to predict reservoir production. As shown in FIG. 24, the wells 320 and 322 are shown as having been drilled in the reservoir for illustrative purposes. Therefore, the time frame for the entire simulation process by the data processing system D includes the geological basin history over geological time in the past and continuing forward in time until the date that reservoir wells began producing and beyond into future forecast production. For example time frames in years, geological basin history might be one hundred million years and reservoir production history and forecast could be fifty years.

From the foregoing, it can be seen that the data processing system D of the present invention determines the migration of oil and gas by basin simulation section 108 and with reservoir simulation section 110 predicts future reservoir performance from current reservoir production measures. The data processing system D provides more accurate reservoir rock and fluid property distribution in reservoir locations between well locations where such attributes cannot be measured.

The data processing system D operates based on physical realities captured from migration by the basin simulation section 108. The data processing system differs from conventional methods, which use measurements obtained at the wells and interpolate reservoir rock and fluid property distribution for regions between the wells using statistical techniques.

Results from the data processing system D of the present invention shed more light into reservoir discontinuities among the wells, and yield better distribution of reservoir parameters of interest, as well as hydrocarbon gas. Light Oil, and Heavy Oil (tar) zones within the reservoir. More accurate initial fluid and rock property distribution within the reservoir in a reservoir model obtained with the data processing system D also improves production forecasting accuracy for hydrocarbon reservoirs by the reservoir simulation section 110.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A data processing system locating sources of hydrocarbons in subsurface formations, comprising:
a reservoir simulator, comprising:
a reservoir model comprising an organized grid of reservoir cells representing the reservoir;
a basin simulation section configured to:
receive geological data comprising properties of formations in the reservoir over a historical time period that precedes an initial time of production from the wells in the reservoir; and
determine, based on the geological data, an initial basin simulation prediction that comprises predicted measures of reservoir attributes in the grid cells of the reservoir model at locations between the wells in the reservoir at a given point in time;
a reservoir simulation section configured to:
receive initial reservoir data that comprises observed actual reservoir rock and fluid properties in the wells of the reservoir at the initial time of production from the wells in the reservoir; and
determine, based on the initial reservoir data and the initial basin simulation prediction, a reservoir simulation section prediction that comprises predicted measures of reservoir attributes in the grid cells of the reservoir model at the locations between the wells in the reservoir at the given point in time;
a processor configured to calibrate the initial basin simulation prediction with the reservoir simulation section prediction to generate a calibrated initial basin simulation prediction that comprises calibrated predicted measures of reservoir attributes in the grid cells of the reservoir model at locations between the wells in the reservoir at the given point in time, the calibration comprising an optimization operation comprising minimizing an objective function by way of iterative assessment of the objective function to determine when differences between (a) the initial basin simulation prediction, including the predicted measures of reservoir attributes in the grid cells of the reservoir model at the locations between the wells in the reservoir at the given point in time, and (b) the reservoir simulation section prediction, including the predicted measures of reservoir attributes in the grid cells of the reservoir model at the locations between the wells, correspond within a specified degree of accuracy, and
the basin simulation section further configured to determine, based on the calibrated initial basin simulation prediction, measures of reservoir rock property and fluid property conditions in the grid cells of the reservoir model indicating presence of hydrocarbons in the reservoir at locations away from the wells based on the calibrated initial basin simulation predicted measures of reservoir attributes in the grid cells of the reservoir model, and the reservoir simulation section further configured to determine, based on the calibrated initial basin simulation prediction, predicted measures of reservoir production from the grid cells of the reservoir model at locations between the wells in the reservoir, wherein the calibrated initial basin simulation prediction comprises reservoir attributes comprising reservoir rock properties that comprise fluid saturation.

2. The data processing system of claim 1, wherein the grid of reservoir cells representing the reservoir are organized into a three dimensional grid co-ordinate matrix.

3. The data processing system of claim 1, wherein the reservoir attributes comprise reservoir rock properties.

4. The data processing system of claim 3, wherein the reservoir rock properties comprise fluid saturation.

5. The data processing system of claim 3, wherein the reservoir rock properties comprise formation thickness.

6. The data processing system of claim 3, wherein the reservoir rock properties comprise formation porosity.

7. The data processing system of claim 3, wherein the reservoir rock properties comprise formation permeability.

8. The data processing system of claim 1, wherein the reservoir attributes comprise reservoir fluid properties.

9. The data processing system of claim 8, wherein the reservoir fluid properties comprise fluid temperature.

10. The data processing system of claim 8, wherein the reservoir fluid properties comprise fluid pressure.

11. The data processing system of claim 8, wherein the reservoir fluid properties comprise component concentration.

12. The data processing system of claim 8, wherein the reservoir fluid properties comprise component fluid concentration.

13. The data processing system of claim 8, wherein the reservoir produces hydrocarbons migrated from source rock in the subsurface formations and wherein:

the basin simulation section is further configured to determine, based on the calibrated initial basin simulation prediction, measures of reservoir rock property and fluid property conditions in the grid cells of the reservoir model indicating presence of hydrocarbons in the reservoir at locations of source rock in the subsurface formations and away from the wells.

14. A method for locating sources of hydrocarbons in subsurface formations, the method comprising:

receiving, by a basin simulation section, geological data comprising properties of formations in the reservoir over a historical time period that precedes an initial time of production from the wells in the reservoir;

determining, by the basin simulation section and based on the geological data, an initial basin simulation prediction that comprises predicted measures of reservoir attributes in the grid cells of the reservoir model at locations between the wells in the reservoir at a given point in time;

receiving, by a reservoir simulation section, initial reservoir data that comprises observed actual reservoir rock and fluid properties in the wells of the reservoir at the initial time of production from the wells in the reservoir;

determining, by the reservoir simulation section and based on the initial reservoir data and the initial basin simulation prediction, a reservoir simulation section prediction that comprises predicted measures of reservoir attributes in the grid cells of the reservoir model at the locations between the wells in the reservoir at the given point in time;

calibrating, by a processor, the initial basin simulation prediction with the reservoir simulation section prediction to generate a calibrated initial basin simulation prediction that comprises calibrated predicted measures of reservoir attributes in the grid cells of the reservoir model at locations between the wells in the reservoir at the given point in time, the calibration comprising an optimization operation comprising minimizing an objective function by way of iterative assessment of the objective function to determine when differences between (a) the initial basin simulation prediction, including the predicted measures of reservoir attributes in the grid cells of the reservoir model at the locations between the wells in the reservoir at the given point in time, and (b) the reservoir simulation section prediction, including the predicted measures of reservoir attributes in the grid cells of the reservoir model at the locations between the wells, correspond within a specified degree of accuracy, determining, by the basin simulation section based on the calibrated initial basin simulation prediction, measures of reservoir rock property and fluid property conditions in the grid cells of the reservoir model indicating presence of hydrocarbons in the reservoir at locations away from the wells based on the calibrated initial basin simulation predicted measures of reservoir attributes in the grid cells of the reservoir model, and determining, by the reservoir simulation section based on the calibrated initial basin simulation prediction, predicted measures of reservoir production from the grid cells of the reservoir model at locations between the wells in the reservoir, wherein the calibrated initial basin simulation prediction comprises reservoir attributes comprising reservoir rock properties that comprise fluid saturation.

15. The method of claim 14, wherein the reservoir attributes comprise reservoir rock properties.

16. The method of claim 15, wherein the reservoir rock properties comprise fluid saturation.

17. The method of claim 15, wherein the reservoir rock properties comprise formation thickness.

18. The method of claim 15, wherein the reservoir rock properties comprise formation porosity.

19. The method of claim 15, wherein the reservoir rock properties comprise formation permeability.

20. The method of claim 14, wherein the reservoir attributes comprise reservoir fluid properties.

21. The method of claim 20, wherein the reservoir fluid properties comprise fluid temperature.

22. The method of claim 20, wherein the reservoir fluid properties comprise fluid pressure.

23. The method of claim 20, wherein the reservoir fluid properties comprise component concentration.

24. The method of claim 20, wherein the reservoir fluid properties comprise component fluid concentration.

25. A non-transitory computer readable storage medium comprising program instruction stored thereon that are executable by a computer processor to cause the following operations for locating sources of hydrocarbons in subsurface formations, the method comprising:

receiving, by a basin simulation section, geological data comprising properties of formations in the reservoir over a historical time period that precedes an initial time of production from the wells in the reservoir;

determining, by the basin simulation section and based on the geological data, an initial basin simulation prediction that comprises predicted measures of reservoir attributes in the grid cells of the reservoir model at locations between the wells in the reservoir at a given point in time;

receiving, by a reservoir simulation section, initial reservoir data that comprises observed actual reservoir rock and fluid properties in the wells of the reservoir at the initial time of production from the wells in the reservoir;

determining, by the reservoir simulation section and based on the initial reservoir data and the initial basin simulation prediction, a reservoir simulation section prediction that comprises predicted measures of reservoir attributes in the grid cells of the reservoir model at the locations between the wells in the reservoir at the given point in time;

calibrating, by a processor, the initial basin simulation prediction with the reservoir simulation section prediction to generate a calibrated initial basin simulation prediction that comprises calibrated predicted measures of reservoir attributes in the grid cells of the reservoir model at locations between the wells in the reservoir at the given point in time, the calibration comprising an optimization operation comprising minimizing an objective function by way of iterative assessment of the objective function to determine when differences between (a) the initial basin simulation prediction, including the predicted measures of reservoir attributes in the grid cells of the reservoir model at the locations between the wells in the reservoir at the given point in time of the initial basin simulation prediction and (b) the reservoir simulation section prediction, including the predicted measures of reservoir attributes in the grid cells of the reservoir model at the locations between the wells, correspond within a specified degree of accuracy, determining, by the basin simulation section based on the calibrated initial basin simulation prediction, measures of reservoir rock property and fluid property conditions in the grid cells of the reservoir model indicating presence of hydrocarbons in the reservoir at locations away from the wells based on the calibrated initial basin simulation predicted measures of reservoir attributes in the grid cells of the reservoir model, and determining, by the reservoir simulation section based on the calibrated initial basin simulation prediction, predicted measures of reservoir production from the grid cells of the reservoir model at locations between the wells in the reservoir, wherein the calibrated initial basin simulation prediction comprises reservoir attributes comprising reservoir rock properties that comprise fluid saturation.

* * * * *